(12) United States Patent
Takamatsu

(10) Patent No.: US 8,543,583 B2
(45) Date of Patent: Sep. 24, 2013

(54) INFORMATION PROCESSING APPARATUS, INFORMATION PROCESSING METHOD, AND PROGRAM

(75) Inventor: Shingo Takamatsu, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 13/414,931

(22) Filed: Mar. 8, 2012

(65) Prior Publication Data

US 2012/0246176 A1      Sep. 27, 2012

(30) Foreign Application Priority Data

Mar. 24, 2011   (JP) ................................ 2011-065240
Nov. 29, 2011   (JP) ................................ 2011-261036

(51) Int. Cl.
*G06F 7/00*          (2006.01)
*G06F 17/30*         (2006.01)

(52) U.S. Cl.
USPC .......................................................... 707/749

(58) Field of Classification Search
USPC .......... 707/223, 224, 602, 748, 749; 714/748
See application file for complete search history.

(56) References Cited

U.S. PATENT DOCUMENTS

| | | | |
|---|---|---|---|
| 8,316,047 B2 * | 11/2012 | Bayliss ........................ | 707/780 |
| 2004/0243394 A1 * | 12/2004 | Kitamura ........................ | 704/9 |
| 2005/0108630 A1 * | 5/2005 | Wasson et al. ................ | 715/513 |
| 2007/0294201 A1 * | 12/2007 | Nelken et al. .................. | 706/60 |
| 2009/0106244 A1 * | 4/2009 | Dash et al. ........................ | 707/6 |
| 2009/0157664 A1 * | 6/2009 | Wen ................................ | 707/5 |
| 2009/0222407 A1 * | 9/2009 | Takuma et al. ................... | 707/2 |
| 2009/0271363 A1 * | 10/2009 | Bayliss ............................ | 707/2 |
| 2009/0287674 A1 * | 11/2009 | Bouillet et al. ................... | 707/5 |
| 2010/0161988 A1 * | 6/2010 | Robshaw et al. ............. | 713/170 |
| 2011/0270604 A1 * | 11/2011 | Qi et al. ............................ | 704/9 |
| 2012/0030152 A1 * | 2/2012 | Pueyo et al. ................... | 706/12 |
| 2012/0078918 A1 * | 3/2012 | Somasundaran et al. ..... | 707/748 |

OTHER PUBLICATIONS

"Distant Supervision for Relation Extraction Without Labeled Data", by Mike Mintz, Steven Bills, Rion Snow and Dan Jurafsky. Stanford University/Stanford, CA 97305. pp. 1003-1011. Jan. 5, 2012. mikemintz,sbills,rion,jurafsky@cs.stanford.edu; proceedings of the 47th Annual Meeting of the ACL and the 4th IJCNLP of the AFNLP, Suntec, Singapore, Aug. 2-7, 2009., pp. 1003-1011.

* cited by examiner

*Primary Examiner* — Robert Beausoliel, Jr.
*Assistant Examiner* — Nicholas Allen
(74) *Attorney, Agent, or Firm* — Lerner, David, Littenberg, Krumholz & Mentlik, LLP

(57) ABSTRACT

An information processing apparatus includes: a document analyzing unit that extracts phrases including a pair of entities, to which a relevance label is granted, from document data; and a label granting unit that grants the relevance label. The label granting unit acquires vocabulary syntax patterns included in the phrases including the pair of entities, acquires the appearing number of times the vocabulary syntax pattern appears in the document data from the document data, counts the number of pairs of entities, sets a probability model created from a probability density distribution, a parameter Z indicating validity of the granting of the relevance label, and a parameter a indicating a probability of rightly granting the relevance label, calculates the parameters Z and a for which a likelihood is maximum in the probability model, evaluates the validity of the granting of the relevance label, and grants the relevance label on the evaluation result.

10 Claims, 15 Drawing Sheets

INPUT: DOCUMENT

····Tom Jackson was born in Indiana.···
Tom Jackson collaborated with Ken McCartney
in early 1980s. ······· Alice worked alongside Taro Suzuki.
·····

OUTPUT: RELEVANCE DATABASE
CORRESPONDENCE DATA BETWEEN RELEVANCE LABEL AND PAIR OF ENTITIES
(RELEVANCE LABEL = RELEVANCE BETWEEN TWO ENTITIES)

| RELEVANCE LABEL | ENTITY 1 | ENTITY 2 |
|---|---|---|
| BIRTHPLACE | Tom Jackson | Indiana |
| COLLABORATION | Tom Jackson | Ken McCartney |
| COLLABORATION | Alice | Taro Suzuki |
| ····· | ····· | ····· |

FIG. 1A

INPUT: DOCUMENT

····Tom Jackson was born in Indiana.····
Tom Jackson collaborated with Ken McCartney
in early 1980s. ········ Alice worked alongside Taro Suzuki.
······

FIG. 1B

OUTPUT: RELEVANCE DATABASE
CORRESPONDENCE DATA BETWEEN RELEVANCE LABEL AND PAIR OF ENTITIES
(RELEVANCE LABEL = RELEVANCE BETWEEN TWO ENTITIES)

| RELEVANCE LABEL | ENTITY 1 | ENTITY 2 |
|---|---|---|
| BIRTHPLACE | Tom Jackson | Indiana |
| COLLABORATION | Tom Jackson | Ken McCartney |
| COLLABORATION | Alice | Taro Suzuki |
| ······ | ······ | ······ |

EXTRACTION OF THREE DATA ITEMS THROUGH SYNTAX ANALYSIS

THREE DATA ITEMS = TWO ENTITIES AND VOCABULARY SYNTAX PATTERN
VOCABULARY SYNTAX PATTERN: WORD STRING ALONG SHORTEST PASS OF SYNTAX ANALYSIS BETWEEN TWO ENTITIES

VOCABULARY SYNTAX PATTERN: born in

EXTRACTION OF THREE DATA ITEMS FROM PLURALITY OF PHRASES IN DOCUMENT

FIG. 3

| VOCABULARY SYNTAX PATTERN | RELEVANCE LABEL | | |
|---|---|---|---|
| | BIRTHPLACE | PLACE OF DEATH | ORIGIN |
| born in | 1 | 0 | 1 |
| band from | 0 | 0 | 1 |
| died in | 0 | 1 | 0 |
| moved to | 0 | 0 | 0 |
| ...... | ...... | ...... | ...... |

1 IS SHOWN WHEN VOCABULARY SYNTAX PATTERN INDICATES RELEVANCE OF RELEVANCE LABEL AND 0 IS SHOWN WHEN VOCABULARY SYNTAX PATTERN DOES NOT INDICATE RELEVANCE OF RELEVANCE LABEL

FIG. 4

| RELEVANCE LABEL | ENTITY 1 | ENTITY 2 |
|---|---|---|
| BIRTHPLACE | Tom Jackson | Indiana |
| BIRTHPLACE | Ken Tanaka | Tokyo |
| BIRTHPLACE | Rie Kobayashi | Sapporo |
| PLACE OF DEATH | Tom Jackson | Loa Angeks |
| PLACE OF DEATH | Alice | London |
| ... | ... | ... |

EXISTING RELEVANCE DATABASE IS REFERRED TO AS TEACHER DATABASE USED AS TEACHER DATA

FIG. 5

| VOCABULARY PATTERN | BIRTHPLACE | PLACE OF DEATH | LIVE |
|---|---|---|---|
| born in | 322/1342 | 52/1342 | 167/1342 |
| band from | 2/678 | 1/678 | 123/678 |
| died in | 50/522 | 102/522 | 14/522 |
| moved to | 134/763 | 67/763 | 50/763 |
| ...... | ...... | ...... | ...... |

VALUE OF TABLE = GRANT NUMBER OF LABELS/APPEARING NUMBER OF PATTERNS
- WHEN PAIR OF ENTITIES APPEARING TOGETHER WITH PATTERN IS PRESENT IN WEAK TEACHER DATABASE, LABEL IS GRANTED TO PATTERN
  - BIRTHPLACE ⇒ (Tom Jackson, born in, Indiana)
  - BIRTHPLACE ⇒ (Alice, born in, Bay City)
  - (NO) ⇒ (Eri Nakamura, born in, London)   NO PRESENCE IN WEAK TEACHER DATABASE
- MISTAKE IS SOMETIMES MADE SINCE LABEL IS GRANTED BY MATCHING OF PAIR OF ENTITIES

FIG. 9

GENERATION OF OVERLAP RATIO MATRIX M OF PAIRS OF ENTITIES

COMMON PORTIONS (N1 TO N3 OR THE LIKE) OF PAIRS OF ENTITIES OF TWO VOCABULARY SYNTAX PATTERNS ARE COUNTED IN ADVANCE

- MATRIX M IS CREATED FROM DATA

MATRIX COMPONENT $mc'c$ IS RATIO FROM VIEWPOINT OF c-th VOCABULARY SYNTAX PATTERN OF COMMON PORTION BETWEEN c'-TH VOCABULARY SYNTAX DATA AND c-TH VOCABULARY SYNTAX PATTERN

ESTIMATION OF PROBABILITY OF WRONGLY GRANTING LABEL TO c-TH VOCABULARY SYNTAX PATTERN IS USED WHEN c'-TH VOCABULARY SYNTAX PATTERN IS RIGHT $mc'c = N2/N3$     $mcc' = N2/N1$ ($mcc = 0$ IS SET)

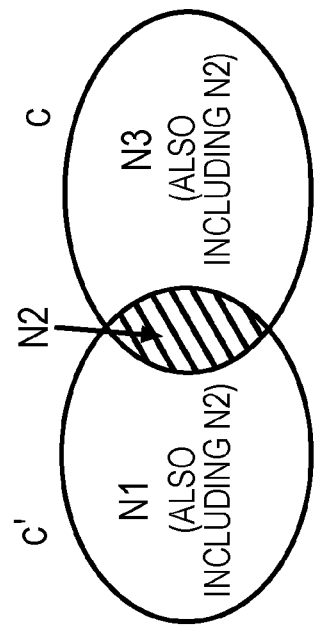

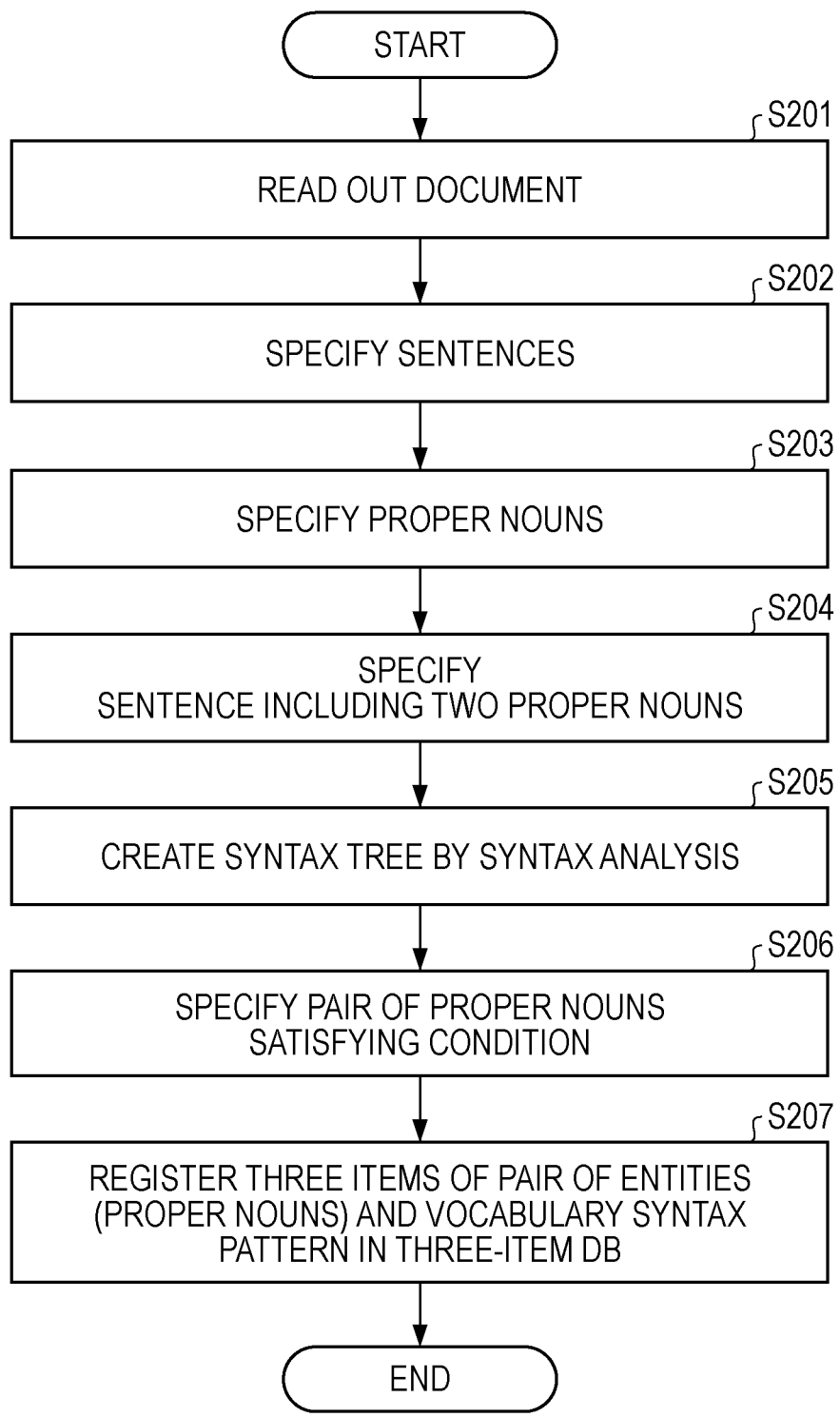

FIG. 13A

DOCUMENT

...The Jackson brothers signed a new contract with BBS Records in June 1975, ... Tom Jackson born in Indiana, ...

FIG. 13B

EXTRACTED THREE DATA ITEMS: PAIR OF ENTITIES AND VOCABULARY SYNTAX PATTERN (b1) (The Jackson brothers, signed contract with, BBS Records)
(b2) (Tom Jackson, born in, Indiana)

INFORMATION PROCESSING APPARATUS, INFORMATION PROCESSING METHOD, AND PROGRAM

CROSS-REFERENCE TO RELATED APPLICATION

The present application claims priority from Japanese Patent Application Nos. JP 2011-065240 filed in the Japanese Patent Office on Mar. 24, 2011, and JP 2011-261036 filed in the Japanese Patent Office on Nov. 29, 2011, the entire contents of which are incorporated herein by reference.

BACKGROUND

The present disclosure relates to an information processing apparatus, an information processing method, and a program, and more particularly, to an information processing apparatus, an information processing method, and a program capable of executing a process of constructing and extending a database (relevance database) that describes a relevance.

Since an abundance of document data has recently been digitized, the lot of document data can be browsed via document accumulation databases, the Internet, and the like. To efficiently obtain necessary information from the abundant document data, processes of creating and using analysis data for documents have been variously suggested.

For example, there has been suggested processes of constructing and using a database that describes the relevance between entities such as two words appearing in a document.

The database that describes a relevance between entities such as two words is referred to as a relevance database. The relevance database can be used for various applications.

The overview of the processes of constructing and using the relevance database will be described.

For example, the following information is registered in the relevance database:
 (a) [Taro, Tokyo] as entities such as two words; and
 (b) (BIRTHPLACE) as a label (relevance label) indicating the relevance between the entities.

The two words (entities) and the relevance label are registered in correspondence with each other.

In this way, the following data are registered in correspondence with each other in the relevance database:
 (a) a plurality of entities (words); and
 (b) a label (relevance label) indicating the relevance between the entities.

Efficient document analysis can be executed by using the relevance database having the registered information.

For example, a sentence (phrase) including two words [Taro, Tokyo] registered in the database is detected from a document to be analyzed.

Thus, the sentence determined to include the registered entities can be determined to be a descriptive text of "BIRTHPLACE."

The birthplace [Tokyo] of [Taro] can be extracted by retrieving the relevance database using one entity [Taro] and the relevance label "BIRTHPLACE" as keys.

Various analyses of the document can be executed at high speed by using the relevance database.

However, in the process of constructing the relevance database, it is necessary to extract relevant words from the document to be processed and determine a label indicating the relevance.

It is costly to execute such a process by manpower.

Many documents have already been constructed in the relevance database, but new abundant documents are disclosed on the Internet or the like every day. However, it is difficult to timely extend the relevance database to correspond to the daily increasing information.

For example, a technique which discloses a process of constructing a relevance database can be exemplified as the following technique according to the related art.

A method of granting teacher information to a document using an existing relevance database and extending the relevance database is disclosed in Distant supervision for relation extraction without labeled data by Mike Mintz, Steven Bills, Rion Snow, and Daniel Jurafsky in 2009, in Proceedings of the Joint Conference of the 47th Annual Meeting of the ACL and the 4th International Joint Conference on Natural Language Processing of the AFNLP (ACL '09), pages 1003-1011, Association for Computational Linguistics. A process of using a pair of entities and a relevance label registered in the relevance database, for example, a pair of entities [Taro, Tokyo] and a relevance label (BIRTHPLACE), which are correspondence data, is described in Distant supervision for relation extraction without labeled data by Mike Mintz, Steven Bills, Rion Snow, and Daniel Jurafsky in 2009, in Proceedings of the Joint Conference of the 47th Annual Meeting of the ACL and the 4th International Joint Conference on Natural Language Processing of the AFNLP (ACL '09), pages 1003-1011, Association for Computational Linguistics.

A relevance label (here, BIRTHPLACE) is granted as a teacher label to the description (for example, "Taro born in Tokyo") extracted from a document using data registered in the relevance database. A process of resolving a classification problem using the information registered in the relevance database and extending the relevance database is disclosed.

However, when this method is executed, a problem may arise in that a wrong teacher label is granted. For example, the pair of entities [Taro, Tokyo] and the relevance label (BIRTHPLACE) registered in the relevance database may be granted to the following phrases:
 (A) Taro lived in Tokyo, and
 (B) Taro died in Tokyo.

Specifically, an error may arise in that the pair of entities [Taro, Tokyo] and the relevance label (BIRTHPLACE), which are granted to the phrase "Taro born in Tokyo", are set in a sentence, that is, the phrases (A) and (B) (phrase) which do not describe the birthplace.

Thus, information provided from the existing relevance database is not complete teacher information. This is because the relevance label is granted to the technique in a document by using the pair of entities as a key even when the pair of entities generally indicates a plurality of relevance. In the method disclosed in Distant supervision for relation extraction without labeled data by Mike Mintz, Steven Bills, Rion Snow, and Daniel Jurafsky in 2009, in Proceedings of the Joint Conference of the 47th Annual Meeting of the ACL and the 4th International Joint Conference on Natural Language Processing of the AFNLP (ACL '09), pages 1003-1011, Association for Computational Linguistics, the relevance label is erroneously included in teacher data, thereby deteriorating the entire capability.

SUMMARY

It is desirable to provide an information processing apparatus, an information processing method, and a program capable of constructing or extending a high-precision relevance database by reducing errors in granting of a relevance label.

The present disclosure relates to a method of extending a relevance database using a document group obtainable from websites or the like based on an existing relevance database.

According to an embodiment of the present disclosure, there is provided an information processing apparatus including: a document analyzing unit that extracts phrases including a pair of entities, to which a relevance label is granted, from document data; and a label granting unit that grants the relevance label indicating relevance between the pair of entities. The label granting unit the label granting unit acquires vocabulary syntax patterns included in the phrases including the pair of entities and acquires the appearing number of times the vocabulary syntax pattern appears in the document data from the document data by analyzing registration information regarding an existing relevance database having registration information regarding the pair of entities and the relevance label and the document data in which at least one phrase including the pair of entities registered in a relevance database is present; for a pair of the vocabulary syntax patterns, counts the number of pairs of entities appearing concurrently with both of each pair of the vocabulary syntax patterns in the document data; and sets a probability model created from a probability density distribution, which includes the counted number of pairs of entities, a parameter Z indicating validity of the granting of the relevance label, and a parameter a indicating a probability of rightly granting the relevance label, calculates the parameters Z and a for which a likelihood is maximum in the probability model, evaluates the validity of the granting of the relevance label for the pair of entities extracted from the document data, and grants the relevance label based on the evaluation result.

In the information processing apparatus according to the embodiment of the present disclosure, the label granting unit may acquire the vocabulary syntax patterns included in the phrases including the pair of entities by analyzing the registration information regarding the existing relevance database having the registration information regarding the pair of entities and the relevance label and the document data in which at least one phrase including the pair of entities registered in the relevance database is present; may acquire the number N1 of pairs of entities belonging to a set which has the pairs of entities appearing in the phrases having a vocabulary syntax pattern A, the number N3 of pairs of entities belonging to a set which has the pairs of entities appearing in the phrases having a vocabulary syntax pattern B different from the vocabulary syntax pattern A, and the overlapping number N2 of pairs of entities belonging to a set of an overlapping portion between the set of the pairs of entities appearing in the phrases having the vocabulary syntax pattern A and the set of the pairs of entities appearing in the phrases having the vocabulary syntax pattern B, and then may create an overlapping ratio matrix M having ratio information regarding the three numbers of entities as elements; and may evaluate the validity of the granting of the relevance label for the pair of entities extracted from the document data using a probability model of using the overlapping ratio matrix M and may grant the relevance label based on the evaluation result.

In the information processing apparatus according to the embodiment of the present disclosure, the overlapping ratio matrix M may be a matrix which has a ratio N2/N3 between the numbers N3 and N2 and a ratio N2/N1 between the numbers N1 and N2 as elements.

In the information processing apparatus according to the embodiment of the present disclosure, the label granting unit may grant the relevance label to the pair of entities extracted from the document data in accordance with a value of the parameter Z obtained as a result obtained by changing and converging values of the parameters Z and a in order by the use of the probability model.

In the information processing apparatus according to the embodiment of the present disclosure, the parameter Z may be a parameter having a value of 1 or 0 depending on whether the relevance label is set rightly or wrongly.

In the information processing apparatus according to the embodiment of the present disclosure, the document analyzing unit may acquire data such as the pair of entities included in the extracted phrase, which includes the pair of entities to which the relevance label is granted, and a word string, which is included in a shortest pass binding the pair of entities in a syntax tree of the phrase, as the vocabulary syntax pattern and store the data in a three-item database.

In the information processing apparatus according to the embodiment of the present disclosure, the label granting unit may be configured to select the vocabulary syntax pattern, for which the relevance label is granted, from data stored in the three-item database and may exclude the vocabulary syntax pattern in which the number of pairs of entities corresponding to one vocabulary syntax pattern stored in the three-item database is less than a defined value and the vocabulary syntax pattern corresponding to the pair of entities which is not included in the set of the pairs of entities registered in the existing relevance database from the vocabulary syntax pattern to be processed.

In the information processing apparatus according to the embodiment of the present disclosure, the label granting unit may execute an estimation algorithm of maximum likelihood estimation as a process of estimating the parameters Z and a. The estimation algorithm (i) initializes the parameters Z and a at random and (ii) alternately repeats updating following parameters until convergence (there is no variation in the parameter Z and a variation in the parameter a after a steepest ascending method is equal to or less than 0.001). Further, the estimation algorithm (ii-i) estimates the parameter a by the steepest ascending method after the parameter Z is fixed and (ii-ii), sorts the parameters Z for c at random after fixing the parameter a and sequentially resets a value of each parameter Zc while fixing another parameter Zc so that the likelihood is maximum, and repeats the sorting and resetting until there is no variation in the parameter Z.

According to another embodiment of the present disclosure, there is provided an information processing method which is executed in an information processing apparatus. The information processing method includes: extracting phrases including a pair of entities, to which a relevance label is granted, from document data; and granting the relevance label indicating relevance between the pair of entities. The granting of the relevance label includes: acquiring vocabulary syntax patterns included in the phrases including the pair of entities and acquiring the appearing number of times the vocabulary syntax pattern appears in the document data from the document data by analyzing registration information regarding an existing relevance database having registration information regarding the pair of entities and the relevance label and the document data in which at least one phrase including the pair of entities registered in a relevance database is present; for a pair of the vocabulary syntax patterns, counting the number of pairs of entities appearing concurrently with both of each pair of the vocabulary syntax patterns in the document data; and setting a probability model created from a probability density distribution, which includes the counted number of pairs of entities, a parameter Z indicating validity of the granting of the relevance label, and a parameter a indicating a probability of rightly granting the relevance label, calculating the parameters Z and a for which a likelihood is maximum in the probability model, evaluating the validity of the granting of the relevance label for the pair of entities extracted from the document data, and granting the relevance label based on the evaluation result.

According to still another embodiment of the present disclosure, there is provided a program causing an information processing apparatus to execute information processing including: extracting phrases including a pair of entities, to which a relevance label is granted, from document data; and granting the relevance label indicating relevance between the pair of entities. The granting of the relevance label includes: acquiring vocabulary syntax patterns included in the phrases including the pair of entities and acquiring the appearing number of times the vocabulary syntax pattern appears in the document data from the document data by analyzing registration information regarding an existing relevance database having registration information regarding the pair of entities and the relevance label and the document data in which at least one phrase including the pair of entities registered in a relevance database is present; for a pair of the vocabulary syntax patterns, counting the number of pairs of entities appearing concurrently with both of each pair of the vocabulary syntax patterns in the document data; and setting a probability model created from a probability density distribution, which includes the counted number of pairs of entities, a parameter Z indicating validity of the granting of the relevance label, and a parameter a indicating a probability of rightly granting the relevance label, calculating the parameters Z and a for which a likelihood is maximum in the probability model, evaluating the validity of the granting of the relevance label for the pair of entities extracted from the document data, and granting the relevance label based on the evaluation result.

The program according to the embodiment of the present disclosure is a program that can be provided to, for example, an image processing apparatus or a computer system capable of executing various program codes, by a storage medium or a communication medium provided in a computer-readable format. A process executed in accordance with the program is realized on the information processing apparatus or the computer system by providing the program in the computer-readable format.

Other features, or advantages of the present disclosure will be apparent from the detailed description with reference to embodiments of the present disclosure and the accompanying drawings described below. A system in the specification has a logical collective configuration of a plurality of apparatuses and is not limited to a configuration in which apparatuses with a configuration are included in the same casing.

According to the embodiments of the present disclosure, it is possible to construct or extend the relevance database with high precision. Specifically, the phrases including the pairs of entities to which the relevance label is granted are extracted from the document data. The relevance label indicating the relevance between the pair of entities included in the extracted phrases is granted. The label granting unit acquires the appearing number of times the vocabulary syntax pattern included in the phrases including the pair of entities appears by analysis of the registration information of the existing relevance database, creates the overlapping ratio matrix M of the pair of entities in each vocabulary syntax pattern, sets the probability model including the matrix M, the parameter Z indicating the validity of the relevance label, and the parameter a indicating the probability of light granting the relevance label, calculates the parameters Z and a with the maximum likelihood, and grant the relevance label based on the value of the parameter Z.

By executing the process, it is possible to contract and extend the relevance database with high precision.

BRIEF DESCRIPTION OF THE DRAWINGS

FIGS. 1A and 1B are diagrams illustrating input and output in a process executed by an information processing apparatus according to the present disclosure;

FIG. 3 is a diagram illustrating a correspondence between a vocabulary syntax pattern and a relevance label in the process executed by the information processing apparatus according to the present disclosure;

FIG. 4 is a diagram illustrating an example of the configuration of a relevance database in the process executed by the information processing apparatus according to the present disclosure;

FIG. 5 is a diagram illustrating an example of information obtainable from a teacher database in the process executed by the information processing apparatus according to the present disclosure;

FIG. 9 is a diagram illustrating description of an overlapping ratio matrix M of a pair of entities in the process executed by the information processing apparatus according to the present disclosure;

FIG. 12 is a flowchart of a process of extracting phrases from a document group;

FIGS. 13A and 13B are diagrams illustrating an example of extracted three data items;

DETAILED DESCRIPTION OF EMBODIMENTS

Figure 2A:
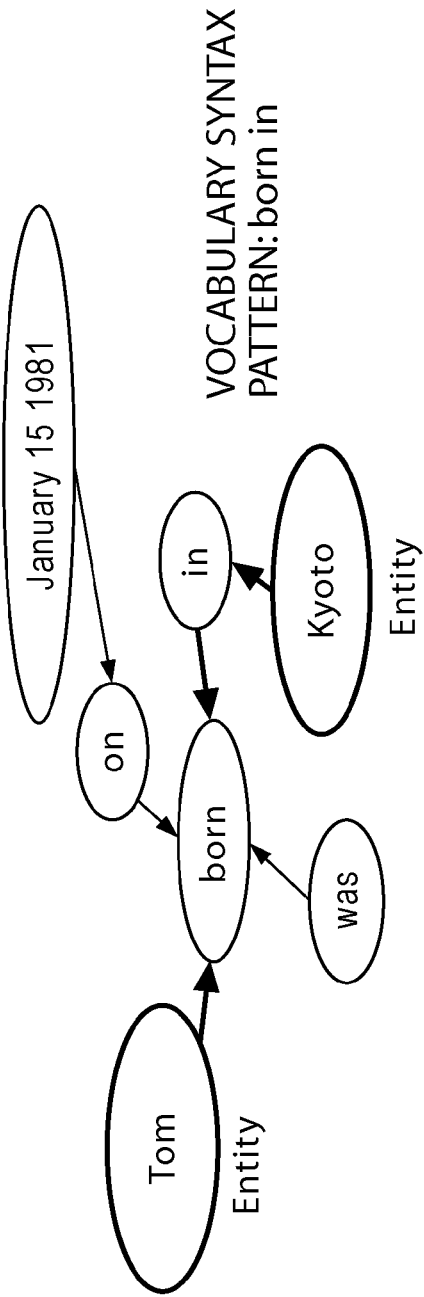
FIGS. 2A and 2B are diagrams illustrating a process of extracting three data items in the process executed by the information processing apparatus according to the present disclosure.

Hereinafter, an information processing apparatus, an information processing method, and a program according to an embodiment of the present disclosure will be described with reference to the drawings.

The description will be made in the following order.
1. Overview of Process Executed by Information Processing Apparatus according to Present Disclosure
2. Configuration of Processing Apparatus and Processing Sequence
3. Details of Processes
3-1. Details of Process (steps S101 and S102) of Extracting Phrases from Document
3-2. Details of Process (steps S103 to S105) of Selecting Relevance Label Setting Target from Extracted Three Data Items
3-3. Details of Process (steps S106 and S107) of Granting Relevance Label
3-3-1. Example of Process Using Probability Model 1
3-3-2. Example of Process Using Probability Model 2
4. Process of Adding Pair of Entities
5. Review of Configuration according to Present DISCLOSURE 1. Overview of Process Executed by Information Processing Apparatus according to Present Disclosure First, the overview of a process of the information processing apparatus according to the embodiment of the present disclosure will be described.

The information processing apparatus according to the embodiment of the present disclosure executes a process of extracting a pair of entities (entities are set as proper nouns or the like) having a relevance one another from a document and specifying the pair of entities.

The process of specifying a relevance between the pair of entities extracted from a document, that is, a process of setting a relevance label in a new pair of entities is executed using a relevance label which has been registered in, for example, an existing database.

The information processing apparatus according to the embodiment of the present disclosure sets the relevance label for the pair of entities extracted from a new document by using a constructed relevance database (DB), that is, an existing relevance database (DB) constructed as a set of correspondence information between the pair of entities and the relevance label and using registration information regarding the relevance database (DB). That is, the information processing apparatus executes a process of extending the existing relevance database (DB).

The overview of the process executed by the information processing apparatus according to the embodiment of the present disclosure will be described.

First, phrases (sentences) including a pair of entities are extracted from a document to be processed. Vocabulary syntax patterns (character string patterns based on a syntax tree and words) indicating a relevance of the extracted pair of entities.

In each vocabulary syntax pattern, the number of pairs of entities included in the phrase including the vocabulary syntax pattern is counted in the document. This number of pairs of entities is referred to as count 1.

Hereinafter, it is considered that zero or more relevance labels are allowed to correspond to the vocabulary syntax pattern. When the vocabulary syntax pattern is determined, it is assumed that the pairs of entities concurrently appearing have a relevance one another. When the relevance label is granted to the pair of entities, the relevance label corresponding to the vocabulary syntax patterns concurrently appearing is granted.

The relevance label is granted to the following vocabulary syntax pattern using the registration information (correspondence information between the pair of entities and the relevance database) regarding the existing relevance DB (this correspondence is difference from the above-described correspondence of the relevance label).

Whether there is the relevance label corresponding to the pair of entities from the existing relevance DB is determined on each pair of entities appearing concurrently with the vocabulary syntax pattern. When it is confirmed that there is the relevance label, the relevance label is granted as the relevance label for the pair of entities appearing concurrently with the vocabulary syntax pattern.

This process is executed on all of the vocabulary syntax patterns. This process is referred to as label granting sequence 1. The number of times by which the relevance label is granted to the vocabulary syntax pattern is counted for the respective pairs of entities of the vocabulary syntax pattern and the relevance label. This number of times is referred to as count 2.

In the information processing apparatus according to the embodiment of the present disclosure, count 1 and count 2 are used as keys allowing the relevance label to correspond to the vocabulary syntax pattern. Basically, in the pairs of entities of the vocabulary syntax pattern and the relevance label, the vocabulary syntax pattern for the pair of entities having a large value of (count 2)/(count 1) is expected to correspond to the relevance label.

However, when the relevance label is granted to the vocabulary syntax pattern in label granting sequence 1, the relevance label originally indicating no relevance may be granted to the vocabulary syntax pattern. This is because since the pair of entities generally has a plurality of relevance, the relevance label in the relevance DB may not necessarily indicate the relevance between the pair of entities described in a document even when the pair of entities in the relevance DB is identical with the pair of entities in a document.

Specifically, for example, when a pair of entities are two proper nouns, Taro and Tokyo, relevance labels indicating various kinds of relevance, such as BIRTHPLACE, PLACE OF LIVING, and PLACE OF DEATH, are likely to be granted as the relevance labels indicating the relevance between the two proper nouns.

In this way, even the same pair of entities generally has a plurality of relevance. Therefore, even when the pair of entities in the relevance DB is identical with the pair of entities in a document, the relevance label in the relevance DB may not necessarily indicate the relevance between the pair of entities described in the document.

For example, it is supposed that the existing relevance database has registration information regarding only BIRTHPLACE as the relevance label for the pair of entities, Taro and Tokyo, and a phrase of a document to be newly processed is "Tom lives in Tokyo."

In this case, a right relevance label for the vocabulary syntax pattern corresponding to this phrase is PLACE OF LIVING. However, when the registration information in the existing relevance database is applied without change, BIRTHPLACE is set as the relevance label.

Thus, there is a concern that a wrong relevance label may be set.

In the information processing apparatus according to the embodiment of the present disclosure, the number of pairs of entities appearing in common is counted for all of the pairs of entities of the vocabulary syntax patterns. This number is referred to as count 3. Count 3 can be used in estimation of a probability in which a wrong relevance label is granted to the vocabulary syntax patterns.

In the information processing apparatus according to the embodiment of the present disclosure, a probability (the granted relevance label is expressed by count 1 and count 2)

of granting the relevance label in label granting sequence 1 is modeled using, for example, parameters and count 3 described below.

A parameter Zc is a binary parameter which can be allocated to each pair of entities of a vocabulary syntax pattern c and a relevance label. Here, one relevance label is considered.

A parameter Zc=1 represents that the vocabulary syntax pattern c indicates the relevance of the relevance label.

A parameter Zc=0 represents that the vocabulary syntax pattern c indicates no relevance of the relevance label.

An estimation result of this parameter serves as a correspondence relation between the vocabulary syntax pattern and the relevance label.

A parameter a is a real-valued parameter which can be allocated to each relevance label in the range of 0 to 1.

This parameter a represents a probability in which the pair of entities having the relevance of the relevance label is present in the relevance DB.

For example, the relevance label can be allowed to correspond to the vocabulary syntax pattern by estimating each parameter through maximum likelihood estimation.

FIGS. 1A and 1B show an example of a document as input data which is data to be processed by the information processing apparatus according to the embodiment of the present disclosure and an example of constituent data of a relevance database acquired by a process of the information processing apparatus, respectively.

An input document is a digitalized document such as a document disclosed on the Internet.

For example, two words such as proper nouns are selected as a pair of entities from this document.

Further, a relevance label indicating the relevance between the pair of selected entities is determined.

For example, the pair of entities selected from a phrase "Tom Jackson was born in Indiana" included in the document shown in FIG. 1A is "Tom Jackson" and "Indiana."

In this embodiment, the proper nouns are extracted as the pair of entities.

For example, "BIRTHPLACE" indicating the place of the birth is set as the relevance label indicating the relevance between "Tom Jackson" and "Indiana" to execute a process of setting a right relevance label.

The information processing apparatus according to the embodiment of the present disclosure executes the processes of extracting the pair of entities and setting the right relevance label for the pair of extracted entities and processes of adding and updating an entry in the relevance database.

It is relatively easy to mechanically execute a process of selecting proper nouns as the pair of entities, but it is difficult to grant a right relevance label to the pair of selected entities.

The information processing apparatus according to the embodiment of the present disclosure analyzes the syntax of the phrase including the proper nouns as the pair of entities from a document to be preferentially processed and extracts three data items in accordance with a connection form of a syntax tree pass.

This process will be described with reference to FIGS. 2A and 2B.

FIG. 2A shows an example of syntax analysis processing of a document.

A syntax tress pass shown in FIG. 2A is created through the syntax analysis of the following phrase:

phrase: Tom was born in Kyoto on Jan. 15, 1981.

First, two proper nouns, Tom and Kyoto, are extracted as two entities from the syntax tress pass.

Next, the shortest pass binding the two entities is selected and words or a word string along the selected pass are extracted as a "vocabulary syntax pattern."

The three pieces of data, a "pair of entities" including the two entities and the "vocabulary syntax pattern", are acquired as three data items.

In the example shown in FIG. 2A, the pair of entities "Tom" and "Kyoto" and the vocabulary syntax pattern "born in" are extracted.

In this way, the information processing apparatus according to the embodiment of the present disclosure extracts all of the three data items of the pair of entities and the vocabulary syntax pattern from the entire document to be preferentially processed and stores the extracted three data items in a database (three-item database).

Next, a process of setting a light relevance label is executed on the pair of entities included in the three data items stored in the three-item database.

For example, based on the vocabulary syntax pattern, it can be determined whether the relevance label is light set in the pair of entities.

Figure 2B:
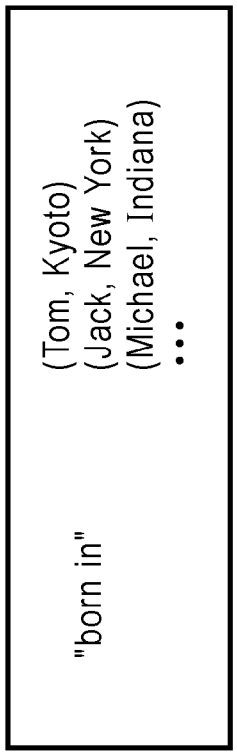

In the example shown in FIGS. 2A and 2B, the vocabulary syntax pattern "born in" is extracted. However, the plurality of phrases from which the vocabulary syntax pattern "born in" is extracted are present in the document to be processed in many cases.

For example, as shown in FIG. 2B, other pairs of entities are selected from the phrases having one identical vocabulary syntax pattern "born in".

A correspondence relation between the relevance label and the vocabulary syntax pattern formed by a word string of the pass on the syntax tree binding the pair of entities will be described with reference to FIG. 3.

FIG. 3 is a diagram illustrating a correction relation expressed by 1 and 0 as the correspondence relation between the relevance label and the vocabulary syntax pattern extracted from the document.

The following words are shown as the vocabulary syntax patterns:
born in,
band from,
died in, and
moved to.

The following words are shown as the relevance labels:
BIRTHPLACE,
PLACE OF DEATH, and
ORIGIN.

[1] is shown in a correspondence section of a right relevance label for the vocabulary syntax pattern.

[0] is shown in a correspondence section of a wrong relevance label for the vocabulary syntax pattern.

That is, for example, the right relevance label for the vocabulary syntax pattern "born in" is "BIRTHPLACE" or "ORIGIN" set with [1].

Further, the right relevance label for the vocabulary syntax pattern "died in" is "PLACE OF DEATH" set with [1].

In this way, the validity of the relevance label can be determined in accordance with the vocabulary syntax pattern.

However, when the process of setting the relevance label is executed by an automatic processing algorithm without decision of a person, the wrong relevance label may be set in the pair of entities in some cases.

The information processing apparatus according to the embodiment of the present disclosure executes a process of setting the relevance label in the pair of entities extracted from a document to be newly processed by using, as teacher information, registration information of the relevance database already constructed based on a given document.

The relevance label set herein is the relevance label set as the registration information of the existing database.

An example of the registration information of the existing relevance database is shown in FIG. 4.

As shown in FIG. 4, correspondence data between the pair of entities (entities 1 and 2) and the relevance label indicating the relevance between the pair or entities are registered in the relevance database.

The information processing apparatus according to the embodiment of the present disclosure executes a process of setting a right relevance label to the pair of entities extracted from a new input document by using, as teach data, the registration information of the existing relevance database.

FIG. 5 is a diagram illustrating information (=observation data D) obtained when the existing database is used as a teacher database.

FIG. 5 shows ratios of the relevance labels [(BIRTHPLACE), (PLACE OF DEATH), . . . ] set in the pairs of entities of the phrases including some vocabulary syntax patterns [(born in), (band from), . . . ].

A value (322/1342) and the like shown in the table of FIG. 5 indicates the grant number of labels/the appearing number of times vocabulary syntax patterns appears.

For example, the number of vocabulary syntax patterns "born in" appearing in the document is 1342.

The number of relevance labels "BIRTHPLACE" granted is 322.

A label granting unit of the information processing apparatus according to the embodiment of the present disclosure acquires the appearing number of times vocabulary syntax patterns included in the phrases including the pair of entities appears by analyzing the registration information regarding the existing relevance database having the registration information regarding the pair of entities and the relevance label and the document data in which at least one phrase including the pair of entities registered in a relevance database is present. Specifically, the label granting unit acquires each data described below.

The label granting unit acquires:

the number N1 of pairs of entities belonging to a set which has the pairs of entities appearing in phrases having a vocabulary syntax pattern A;

the number N3 of pairs of entities belonging to a set which has the pairs of entities appearing in phrases having a vocabulary syntax pattern B different from the vocabulary syntax pattern A; and the overlapping number N2 of pairs of entities belonging to a set of an overlapping portion between the set of the pairs of entities appearing in the phrases having the vocabulary syntax pattern A and the set of the pairs of entities appearing in the phrases having the vocabulary syntax pattern B.

Further, the label granting unit creates an overlapping ratio matrix M having ratio information regarding the three numbers of entities as elements. This process will be described later.

A process of granting the relevance label "PLACE OF DEATH" to the vocabulary syntax pattern "born in" is a process of granting a wrong relevance label.

An occurrence mechanism of an error in setting the relevance label will be described with reference to FIG. 6.

Figure 6:
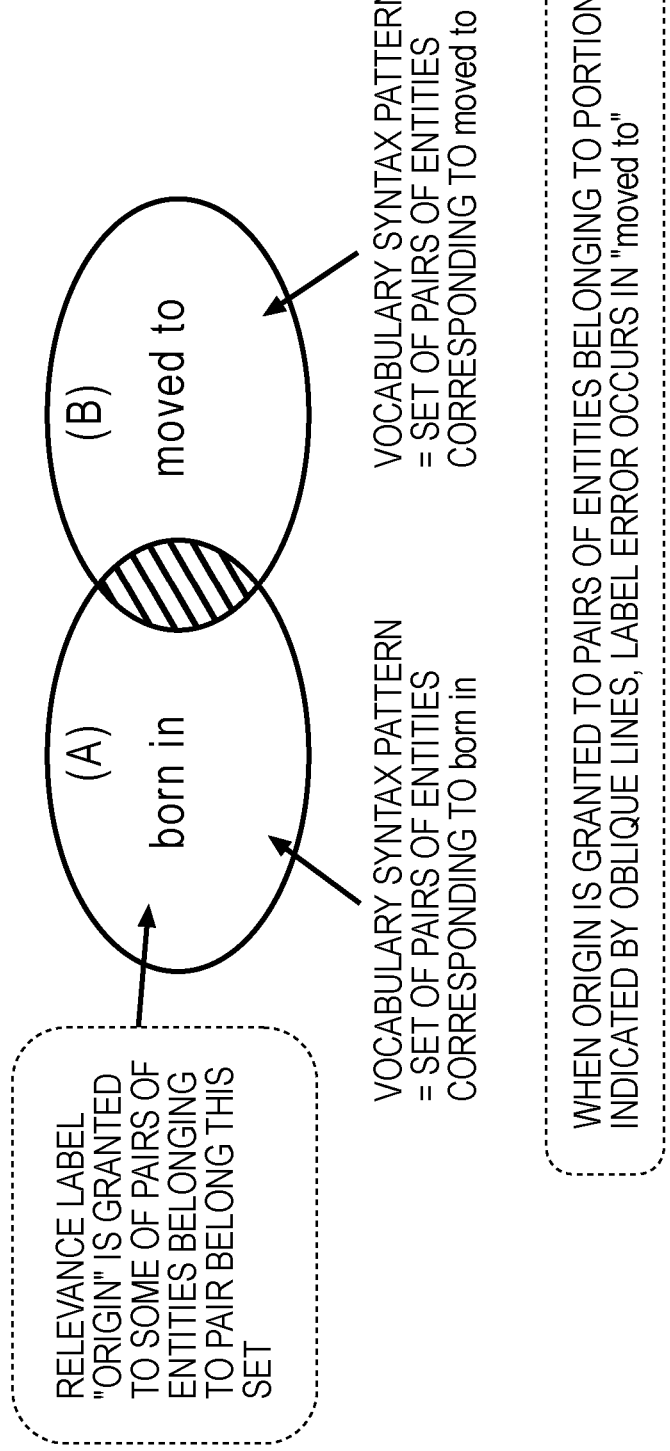
FIG. 6 is a diagram illustrating a mechanism of an error in setting of the relevance label in the process executed by the information processing apparatus according to the present disclosure.

FIG. 6 shows sets (sets A and B) of the pairs of entities extracted from the phrases including two different vocabulary syntax patterns:
born in; and
moved to.

The right relevance label "ORIGIN" is granted to a part of the set A of the pairs of entities of the phrases including the vocabulary syntax pattern (born in).

On the other hand, the wrong relevance label "ORIGIN" is also granted to a part of the set B of the pairs of entities of the phrases including the vocabulary syntax pattern "moved to".

The intersection of the sets A and B is a set of the pairs of entities appearing concurrently with the vocabulary syntax pattern "born in" and "moved to" in the document data.

When the process of granting the relevance label "ORIGIN" to the pair of entities is performed but this pair of entities is the pair of entities for the vocabulary syntax pattern "moved to", the wrong relevance label is set.

The information processing apparatus according to the embodiment of the present disclosure realizes right label setting in consideration of the setting error of the relevance label caused due to this mechanism.

Figure 7:
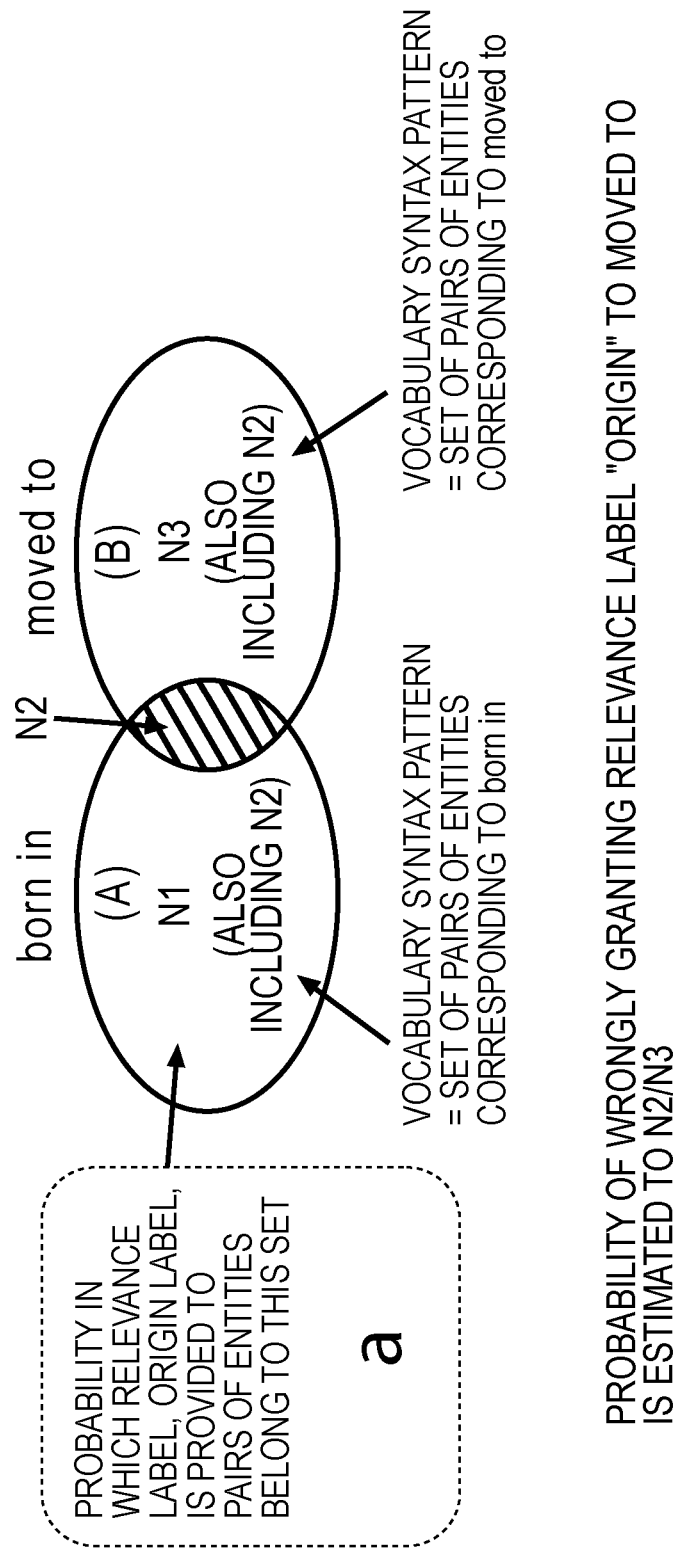
FIG. 7 is a diagram illustrating label grant modeling containing an error in the process executed by the information processing apparatus according to the present disclosure.

FIG. 7 is a diagram illustrating an example of a relevance label granting model used in the information processing apparatus according to the embodiment of the present disclosure.

As in FIG. 6, FIG. 7 shows the sets (the sets A and B) of the pairs of entities extracted from the phrases including two different vocabulary syntax patterns "born in" and "moved to."

It is assumed that N1 is the number of components of the set (the set A) of the pairs of entities extracted from phrases including the vocabulary syntax pattern "born in" and N3 is the number of components of the set (the set B) of the pairs of entities extracted from the phrases including the vocabulary syntax pattern "moved to."

Further, it is assumed that N2 is the number of components of a set of the pairs of entities extracted from an overlapping portion, that is, phrases in which the vocabulary syntax patterns "born in" and "moved to" appear among the phrases.

It is assumed that a is a probability of granting the relevance label "ORIGIN" to the pairs of entities belonging to the set A.

In this case, it can be estimated that a probability of wrongly granting the relevance label "ORIGIN" to the vocabulary syntax pattern "moved to" is $a \times (N2/N3)$.

Next, a potential variable Zc used in the information processing apparatus according to the embodiment of the present disclosure will be described with reference to FIG. 8.

As described above, the relevance label set in the pairs of entities can be allowed to correspond to the vocabulary syntax pattern included in the phrases from which the pairs of entities. However, it is difficult to automatically determine whether the correspondence relation between the vocabulary syntax pattern and the relevance label is right.

In a process according to the embodiment of the present disclosure, the potential variable Zc serving as an index of the determining process is defined and used (here, one relevance label will be used).

Zc is a variable in which a value 0 or 1 is set and indicates the following meaning in accordance with each value:

$Zc=1$: a label granted to the pair of entities of a phrase including a vocabulary syntax pattern c is right; and $Zc=0$: a label granted to the pair of entities of the phrase including the vocabulary syntax pattern c is not right.

Figure 8:
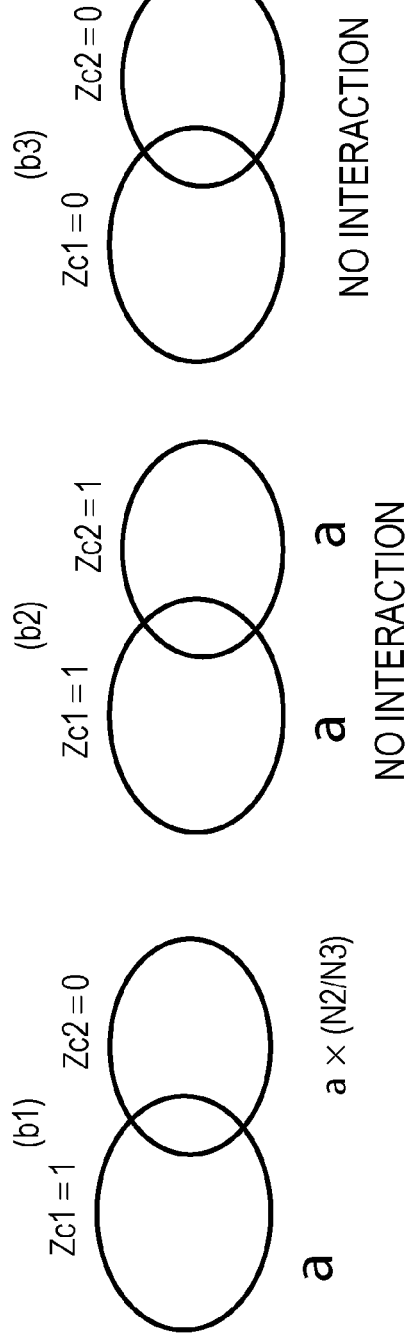
FIG. 8 is a diagram illustrating a potential variable in the process executed by the information processing apparatus according to the present disclosure.

Part (b) of FIG. 8 shows three kinds of relation examples between two vocabulary syntax patterns c1 and c2 having a common portion.

Part (b1) corresponds to the example described with reference to FIG. 7 and shows a case where a probability of granting a wrong relevance label to the different vocabulary syntax pattern c2 is $a \times (N2/N3)$ when a probability of granting a right relevance label to the vocabulary syntax pattern c1 is a.

Parts (b2) and (b3) show examples in which there is no "interaction" in two different vocabulary syntax patterns.

Part (b2) shows the example in which a right relevance label is set in two different vocabulary syntax patterns (Zc1=1 and Zc2=1). A probability of granting the right relevance label to both vocabulary syntax patterns is a.

Part (b3) shows the example in which a wrong relevance label is set in two different vocabulary syntax patterns (Zc1=0 and Zc2=0).

The information processing apparatus according to the embodiment of the present disclosure executes a process using the potential variable which indicates whether a relevance label granted to the pair of entities of phrases including such vocabulary syntax patterns is right or wrong.

The details of this process will be described later.

The information processing apparatus according to the embodiment of the present disclosure sets a predetermined probability model to estimate whether a relevance label is set in a given vocabulary syntax pattern rightly or wrongly.

In a process executed using the probability model, a matrix M is used which is created using the number of sets of pairs of entities corresponding to a plurality of vocabulary syntax patterns.

The matrix M will be described with reference to FIG. 9.

A matrix components (mc'c) forming the matrix M is calculated using the numbers N1 to N3 of components which the same as those described with reference to FIGS. 6 to 8 and are included in the sets of the pairs of entities of the plurality of different vocabulary syntax patterns.

That is, it is assumed that N1 is the number of components of a set (set A) of the pairs of entities extracted from phrases including a vocabulary syntax pattern (C'), N3 is the number of components of a set (set B) of the pairs of entities extracted from phrases including a vocabulary syntax pattern (C), and N2 is the number of components of a set of the overlapping pairs of entities.

The matrix component (mc'c) forming the matrix M corresponds to a ratio of a common portion between a c'-th vocabulary syntax pattern and a c-th vocabulary syntax pattern from the viewpoint of a c-th vocabulary syntax pattern.

Likewise, a matrix component (mcc') forming the matrix M corresponds to a ratio of a common portion between the c-th vocabulary syntax pattern and the c'-th vocabulary syntax pattern from the viewpoint of a c'-th vocabulary syntax pattern.

A relation of "mc'c=N2/N3" and a relation of "mcc'=N2/N1" where mcc=0 are satisfied.

In this way, the information processing apparatus according to the embodiment of the present disclosure sets the predetermined probability model to estimate whether a relevance label is set in a given vocabulary syntax pattern rightly or wrongly.

In the process executed using the probability model, the process is executed using the matrix M formed by the matrix components calculated using the number of sets of the pairs of entities corresponding to the plurality of vocabulary syntax patterns, as described with reference to FIG. 9.

2. Configuration of Processing Apparatus and Processing Sequence

Next, the configuration and a processing sequence of the information processing apparatus according to the embodiment of the present disclosure will be described.

Figure 10:
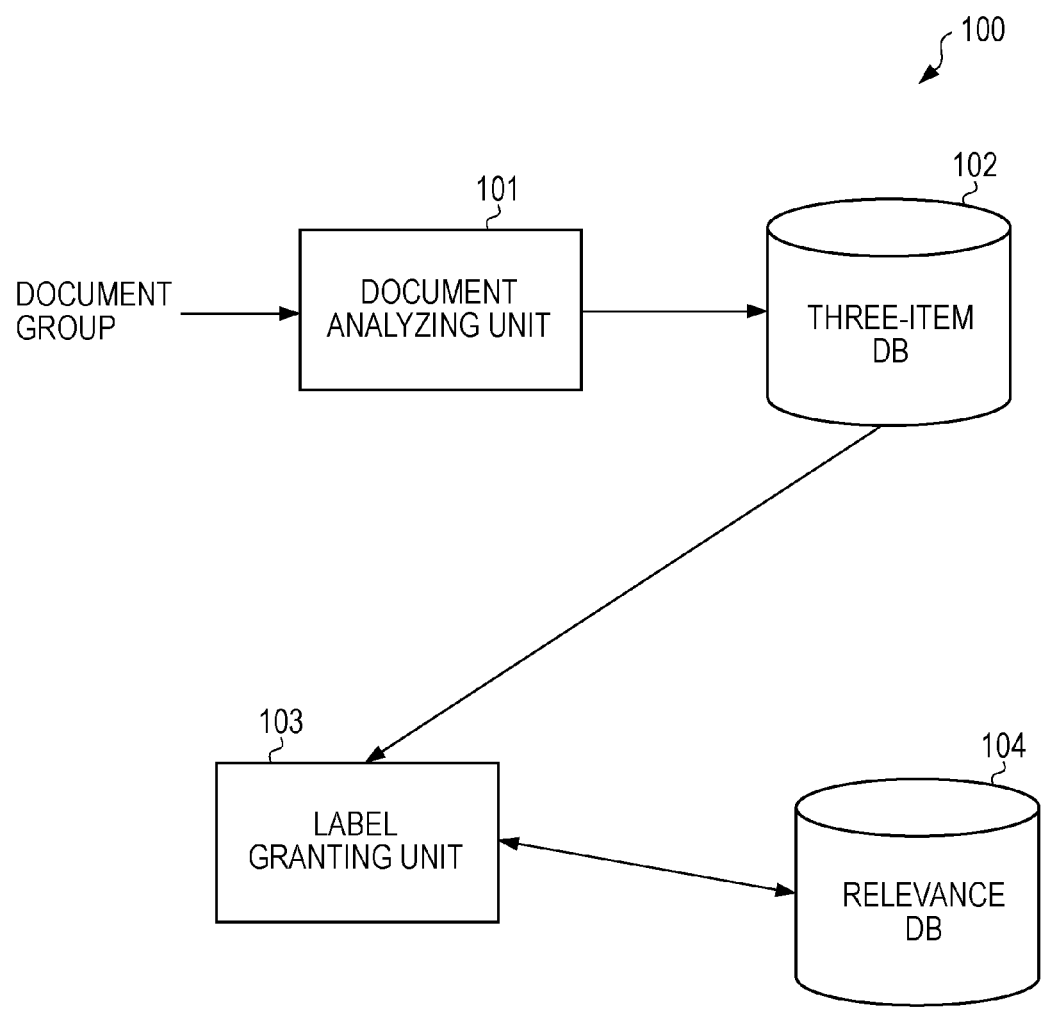
FIG. 10 is a diagram illustrating an example of the configuration of the information processing apparatus according to the present disclosure.

FIG. 10 is a diagram illustrating the configuration of main units of the information processing apparatus according to an embodiment of the present disclosure.

Figure 11:
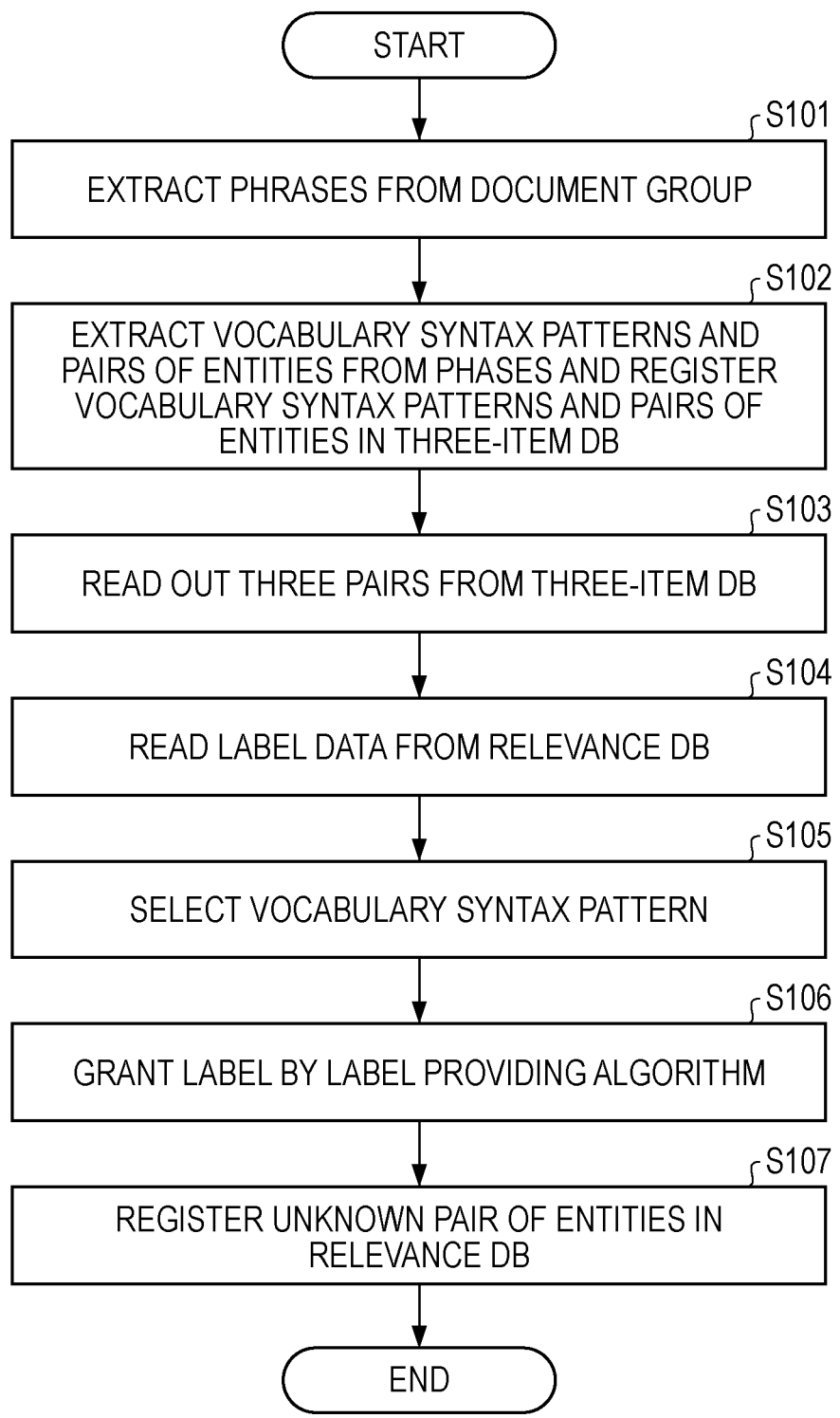
FIG. 11 is a flowchart of the process executed by the information processing apparatus according to the present disclosure.

FIG. 11 is a flowchart illustrating the overall process executed by the information processing apparatus shown in FIG. 10.

As shown in FIG. 10, an information processing apparatus 100 includes a document analyzing unit 101, a three-item database (DB) 102, a label granting unit 103, and a relevance database (DB) 104.

The information processing apparatus 100 includes a memory that records a program executing processes described below and a control unit that includes a CPU serving as a program execution function in addition to the configuration shown in FIG. 10.

In the embodiment described below, for example, a relevance label "BIRTHPLACE" (a person and a place are associated with a birthplace) and a set of pairs of entities corresponding to the relevance label are already registered in the existing relevance database (DB) 104 to be extended.

Based on the information, the information processing apparatus 100 executes a process of setting a right relevance label to the pairs of entities extracted from a new document with high precision.

The language of the document to be processed is English.

In the embodiment described below, the relevance label set in a pair of entities is one. However, even when other relevance labels are present, the same process can be executed.

The process executed by the information processing apparatus 100 will be described in accordance with the flowchart of FIG. 11.

The information processing apparatus 100 executes the following processes in accordance with the flowchart of FIG. 11.

In step S101, phrases including the pairs of entities are extracted from a document group.

In step S102, vocabulary syntax patterns and the pairs of entities are extracted from the phrases and are registered in the three-item DB.

In step S103, three data items are read from the three-item database (DB).

In step S104, the label data are read from the relevance database (DB).

In step S105, the vocabulary syntax pattern is selected.

In step S106, the relevance label is granted to the entities in accordance with a predetermined label granting algorithm.

In step S107, the pair of entities and the relevance label are registered in the relevance database (DB).

Hereinafter, the process of each step in the flowchart of FIG. 11 will be described in detail.

3. Details of Processes 3-1. Details of Process (steps S101 and S102) of Extracting Phrases from Document First, a process of extracting the phrases from the document will be described.

This process corresponds to the processes of step S101 and S102 in the flowchart shown in FIG. 11.

In step S101, the phrase including the pairs of entities is extracted from the document group.

In step S102, the vocabulary syntax patterns and the pairs of entities are extracted from the phrases and are stored in the three-item database (DB).

The processes of steps S101 and S102, that is, the process of extracting the phrases including the pairs of entities from the document group is executed by the document analyzing unit 101 of the information processing apparatus 100 shown in FIG. 10.

FIG. 12 shows the detailed flowchart of the process of extracting the phrases from the document group in steps S101 and S102.

FIG. 12 shows the process of extracting the phrases from the document group in accordance with the flowchart of FIG. 12.

In the process of extracting the phrases, a process of extending an existing relevance database is executed based on new document data on the assumption that the existing relevance database is present.

In step S201, a new document is read.

In step S202, sentences are specified from the read document.

In step S203, a process of extracting proper nouns from the specified sentences is executed to specify the proper nouns from the document.

In this embodiment, the proper nouns are set to entities to be registered in the relevance database, that is, entities registered in correspondence with the relevance label.

In step S204, the sentences in which two or more proper nouns appear are extracted.

In step S205, a syntax tree is created by executing dependent structure syntax analysis.

Next, in step S206, the pair of entities (=pairs of proper nouns) satisfying all of the following conditions are specified:

condition 1: there is no dependency relation (relative pronoun) for delimiting the sentence in a syntax tree pass binding two entities (proper nouns);

condition 2: the length of a dependent pass between two entities (proper nouns) in the syntax tree is 3 or less; and condition 3: the number of words between two entities (proper nouns) in an expression of a document is 10 or less.

A pattern obtained by arranging words along the syntax tree pass between the pair of extracted entities in order from the head entity is referred to as a vocabulary syntax pattern.

In step S207, the pair of entities included in the phrase and the vocabulary syntax pattern are registered in the three-item DB 102.

The three items mean data combination of two entities, that is, a "pair of entities" and words along the syntax tree pass binding two entities, that is, a "vocabulary syntax pattern."

The data registered in the three-item DB 102 may include a type (a location, a person, or the like) of the pair of entities.

A process of storing the "pair of entities" and the "vocabulary syntax pattern" in the three-item DB 102 corresponds to the process of step S102 in the flowchart of FIG. 11.

When the same pair of entities and the same vocabulary syntax pattern appear in another phrase, the same pair of entities and the same vocabulary syntax pattern are treated as other three items and are individually registered as other three data items in the three-item DB 102.

FIGS. 13A and 13B show a phrase (three data items) including the pair of entities extracted through the above-described process.

FIG. 13A shows a part of a sentence to be processed.

FIG. 13B shows an example of three data items, that is, a "pair of entities" and a "vocabulary syntax pattern" extracted from the document shown in FIG. 4 and registered in the three-item DB 102.

As shown in FIG. 13A, a document " . . . The Jackson bothers signed a new contract with BBS Records in June 1975, . . . Tom Jackson born in Indiana, . . . " is included in the document to be processed.

The "pair of entities" and the "vocabulary syntax pattern" (=three data items) shown in FIG. 13B are extracted from the document shown in FIG. 13A:

(b1) The Jackson brothers, signed contract with, BBS Records; and (b2) Tom Jackson, born in, Indiana.

In this example, the proper nouns are extracted as entities and the combination of words along a pass binding the entities on a syntax tree is extracted as the vocabulary syntax pattern.

In the extracted phrase (b1), a pair of entities is "The Jackson bothers" and "BBS Records" and a vocabulary syntax pattern (words bound along the pass on the syntax tree) is "signed contract with."

In the extracted phrase (b2), a pair of entities is "Tom Jackson" and "Indiana" and a vocabulary syntax pattern (words bound along the pass on the syntax tree) is "born in."

When the phrase is determined to extract three data items, the pair of entities concurrently appearing has the same relevance.

Hereinafter, a process of allowing a relevance label (BIRTHPLACE) to correspond to three data items registered in the three-item database 102 will be described as one processing example.

3-2. Details of Process (steps S103 to S105) of Selecting Relevance Label Setting Target from Extracted Three Data Items Next, a process of selecting target data, in which a relevance label is set, from the data registered in the three-item database will be described.

Hereinafter, a sentence from which the data registered in the three-item database, that is, three data items, the pair of entities and the vocabulary syntax pattern, are extracted will be described as a "phrase" and a process of setting the relevance label in the phrase will be described.

This process corresponds to a process of granting a relevance label to a pair of entities extracted from a phrase and registered in the three-item database.

This process corresponds to steps S103 to S105 in the flowchart of FIG. 11.

In step S103, the registered three items (the pair of entities and the vocabulary syntax pattern) are read out from the three-item database (DB).

In step S104, the existing label data (relevance label) is read out from the relevance database (DB).

In step S105, the vocabulary syntax pattern for which the relevance label is set is selected.

The processes are executed by the label granting unit 103 shown in FIG. 10.

The series of processes of step S103 to S105 include a process of excluding three items which include a vocabulary syntax pattern having a lesser relation with the registration information of the relevance database 104 and three items including a vocabulary syntax pattern determined to be useless since the appearance frequency in the document is small.

Figure 14:
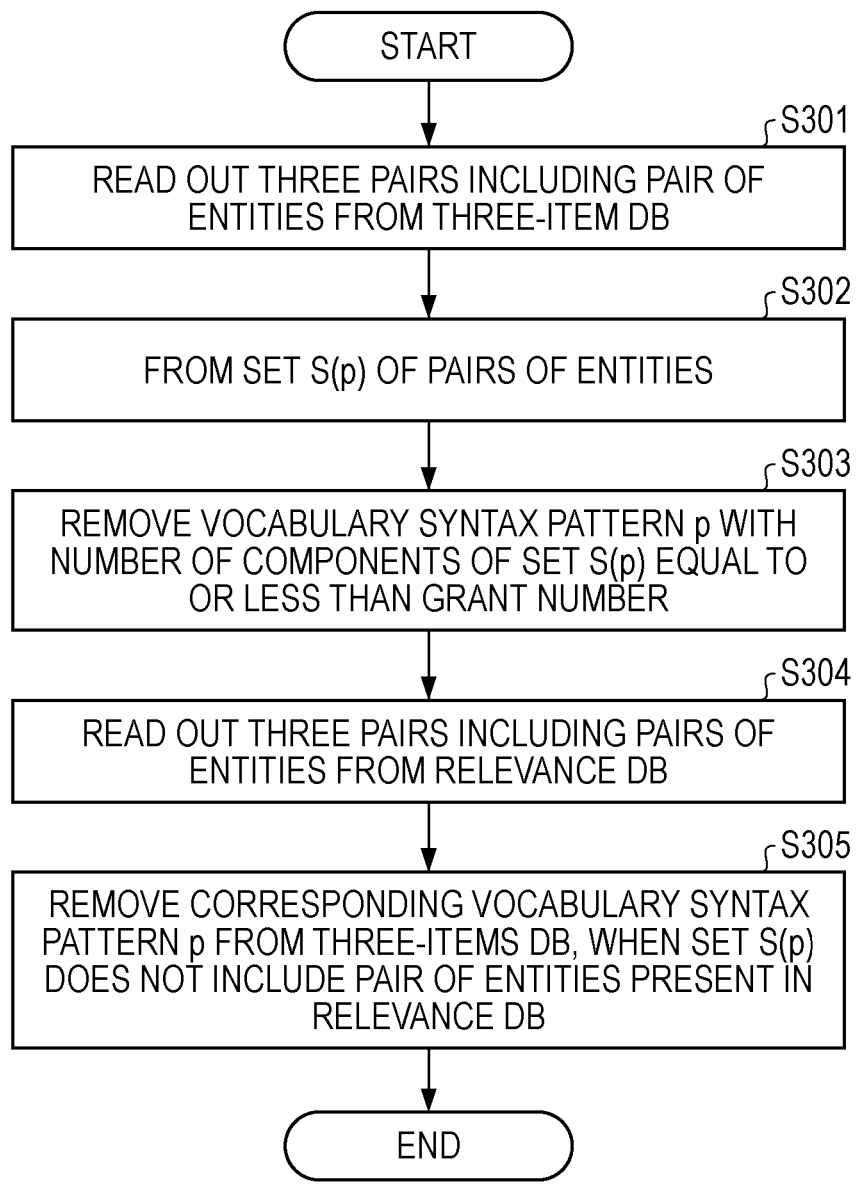
FIG. 14 is a flowchart of a process of selecting a phrase.

The processes of steps S103 to S105 in the flowchart of FIG. 11 will be described in detail with reference to the flowchart of FIG. 14.

In step S301, the label granting unit 103 acquires all of the three data items registered in the three-item DB 102.

Next, in step S302, a set S(p) of the pairs of entities appearing concurrently with a vocabulary syntax pattern is organized for each appearing vocabulary syntax pattern registered in the three-item DB 102.

A set of the pairs of entities corresponding to a given vocabulary syntax pattern p is referred to as a set S(p).

Figure 15:
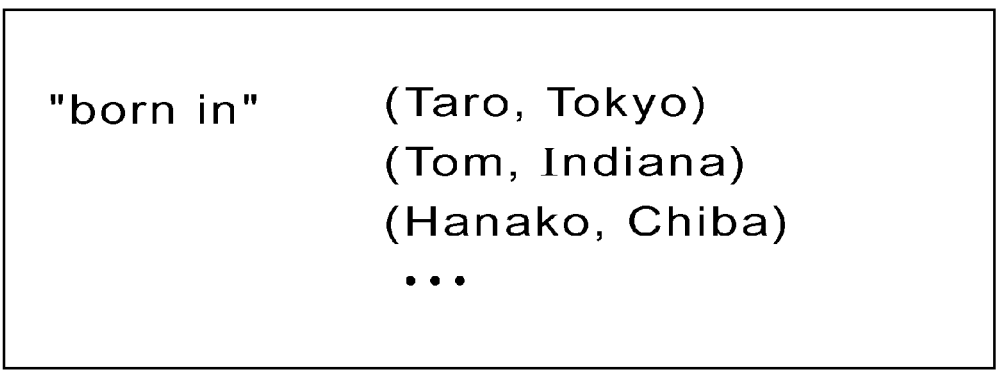
FIG. 15 is a diagram illustrating an example of a set S(p) of the pairs of entities corresponding to a specific vocabulary syntax pattern.

A specific example of the set S(p) of the pairs of entities is shown in FIG. 15.

FIG. 15 shows the example in which the set S(p) has the pairs of entities "Taro, Tokyo", "Tom, Indiana", "Hanako, Chiba", and the like as the pairs of entities of the three items including the string words "born in" corresponding to a vocabulary syntax pattern.

Next, in step S303, a vocabulary syntax pattern p for which the number of components of the set S(p) of the pairs of entities is 10 or less is removed from the three-item database 102.

This process corresponds to the process of excluding the vocabulary syntax pattern determined to be useless since the appearance frequency in the document is small.

Next, in step S304, all of the pairs of entities are read out from the relevance database 104.

Next, in step S305, when the set S(p) does not include the pair of entities present in the relevance database 104, the corresponding vocabulary syntax pattern p is removed from the three-item database 102.

This process corresponds to the process of removing the vocabulary syntax pattern having a lesser relation with the registration information regarding the relevance database 104.

3-3. Details of Process (steps S106 and S107) of Granting Relevance Label

Next, the process of granting the relevance label and the process of registering the data in the database will be described.

The processes correspond to the process of steps S106 and S107 in the flowchart of FIG. 11.

That is, in step S106, the relevance label is granted to the entities in accordance with a predetermined label granting algorithm.

In step S107, the pair of entities and the relevance label are registered in the relevance database (DB).

The processes are executed by the label granting unit 103 shown in FIG. 10.

The relevance label "BIRTHPLACE" is selectively granted to the vocabulary syntax pattern selected as the vocabulary syntax pattern to be processed in step S105.

Specifically, it is inspected whether the pair of entities of the respective components of the set S(p) of the pairs of entities corresponding to the vocabulary syntax pattern p selected in step S105 is present (registered) in the relevance database. When this pair of entities is present, the relevance label "BIRTHPLACE" is granted to the vocabulary syntax pattern p. This process is executed on all of the vocabulary syntax patterns.

A detailed sequence of the process of step S106 in the flowchart of FIG. 11 will be described with reference to the flowchart of FIG. 16.

As described above, the set S(p) of the pairs of entities corresponding to the vocabulary syntax pattern p is formed.

Further, it is assumed that C is the total number of vocabulary syntax patterns selected as the vocabulary syntax patterns to be processed in step S105.

It is assumed that c=1, 2, ..., C are indexes of the vocabulary syntax patterns.

At this time, it is assumed that Nc is the number (the total number of pairs of entities) of components of the set S(p) of the pairs of entities corresponding to the vocabulary syntax pattern p and nc is the number of pairs of entities to which the relevance label is granted in the c-th vocabulary syntax pattern.

The label granting algorithm executed in step S106 in the flowchart of FIG. 11 is executed using a probability model expressed by the parameters Nc and nc.

In this process, the following parameters are used.
Parameter Z(=Zc)

The parameter Zc is a binary parameter which can be assigned to each pair of the c-th vocabulary syntax pattern and relevance label.

The "parameter Zc=1" indicates that the c-th vocabulary syntax pattern is a vocabulary syntax pattern to which a specific relevance label, in this embodiment, BIRTHPLACE, is set.

The "parameter Zc=0" indicates that the c-th vocabulary syntax pattern is not a vocabulary syntax pattern to which a specific relevance label, in this embodiment, BIRTHPLACE, is set.

The estimation result of this parameter is a correspondence relation between the vocabulary syntax pattern and the relevance label "BIRTHPLACE."
Parameter a The parameter a is a real-valued parameter which can be allocated to each relevance label in the range of 0 to 1.

The pairs of entities having the relevance of the specific relevance label, in this embodiment, BIRTHPLACE, indicates a probability registered in the relevance database 104.
Parameter s A parameter s is a real-valued parameter which is equal to or greater 0 and can be allocated to a document.

This parameter indicates a probability of wrongly granting the relevance label "BIRTHPLACE" to the vocabulary syntax pattern due to a cause other than equivocality of the pairs of entities.

These parameters Zc, a, and s are used.

In the process according to this embodiment, the number of pairs of entities appearing in common is counted and used for all of the pairs of entities corresponding to the vocabulary syntax pattern.

The number of components of the overlapping number S(p)∩S(p') between the sets of the pairs of entities corresponding to the vocabulary syntax pattern p and the vocabulary syntax pattern p' is also counted for all of the different vocabulary syntax patterns p≠p'.

The number Nc of components (the total number of pairs of entities) of the set S(p) of the pairs of entities corresponding to the above-described vocabulary syntax pattern p is set as the value counted for the overlapping number.

This number is used in estimation of a probability in which a wrong relevance label is granted to the vocabulary syntax patterns.

When the probability model is defined, the parameters can be obtained by the maximum likelihood estimation or the like. As described above, the binary parameter Zc allocated to each pair of the vocabulary syntax pattern and the relevance label indicates the correspondence relation between the vocabulary syntax pattern and the specific relevance label, in this embodiment, BIRTHPLACE.

Hereinafter, examples of a process executed using two probability models will be described in sequence as examples of the label granting process.

3-3-1. Example of Process Using Probability Model 1

First, an example of the label granting process executed using Probability Model 1 will be described.

As a basic process, a probability dense distribution is set in accordance with Expression 1 below and the parameters a and Z are estimated in accordance with Expression 1.

$$p(D, Z | a, M, s) = \prod_{c=1}^{C} \{a^{n_c}(1-a)^{N_c-n_c}\}^{z_c} \{b_c^{n_c}(1-b_c)^{N_c-n_c}\}^{1-z_c}$$

Expression 1 where, $$b_c = a \Sigma_{n=1}^{|T_c|} sgn(n) F(T_c, n) + s$$

$$D = \{N_c, n_c\}, c=1, \ldots, C$$

Expression 2

Expression (1) above is an expression that represents the probability in which D and Z occur in accordance with the values of a, M, and s.

The parameters a and Z are estimated in accordance with the probability dense distribution (shown in Expression 1).

In this expression, as described above, the parameter a is a parameter which satisfies a relation of $0 \leq a \leq 1$ and is a real-valued parameter which can be allocated to each relevance label in the range of 0 to 1.

This parameter indicates a probability in which the pair of entities having relevance of a specific relevance label, in this example, BIRTHPLACE, is registered in the relevance database 104.

$$Z = \{z_c\}, c = 1, \ldots, C$$

This parameter is a potential variable having the value of 1 or 0. The value of 1 indicates that a specific relevance label, in this embodiment, BIRTHPLACE is rightly granted to the vocabulary syntax pattern and the value of 0 indicates a specific relevance label, in this embodiment, BIRTHPLACE is wrongly granted to the vocabulary syntax pattern.

In Expression 1 above, c is an index of the vocabulary syntax pattern included in the set S and $c = 1, 2, \ldots, C$.

The total number of vocabulary syntax patterns to be processed is C. That is, the total number of vocabulary syntax patterns to be processed which are selected in step S105 is C.

Further, as described above, Nc is the number of components (the total number of pairs of entities) of the set S(p) of the pairs of entities corresponding to the c-th vocabulary syntax pattern and $n_c$ is the number of pairs of entities to which the relevance label is granted in the c-th vocabulary syntax pattern.

In Expression 1, bc indicates a probability (error probability) of granting the relevance label is granted to the pairs of entities when the vocabulary syntax pattern does not indicates the relevance of a specific relevance label, in this embodiment, BIRTHPLACE. A common portion of the set of the plurality of pairs of entities is considered.

In this embodiment, Expression 2 above is applied as a calculation expression of the error probability bc.

Parameters applied to the calculation expression (Expression 2) of the error probability bc are as follows.

$$T_c = \{m_{c'c} \mid z_{c'} = 1\}$$

$F(T_c, n) = $ (the sum of all combinations when $n$ items are created from the components of $T_c$)

$$sgn(n) = \begin{cases} + & \text{if } n \text{ is odd} \\ - & \text{if } n \text{ is even} \end{cases}$$

|T| indicates the number of components of a set T.

The label granting process executed using the probability model in accordance with Expression 1 is executed in the following order.

First, the matrix M applied when the process of estimating the parameters a and Z is defined in accordance with Expression 1 above.

Figure 16:
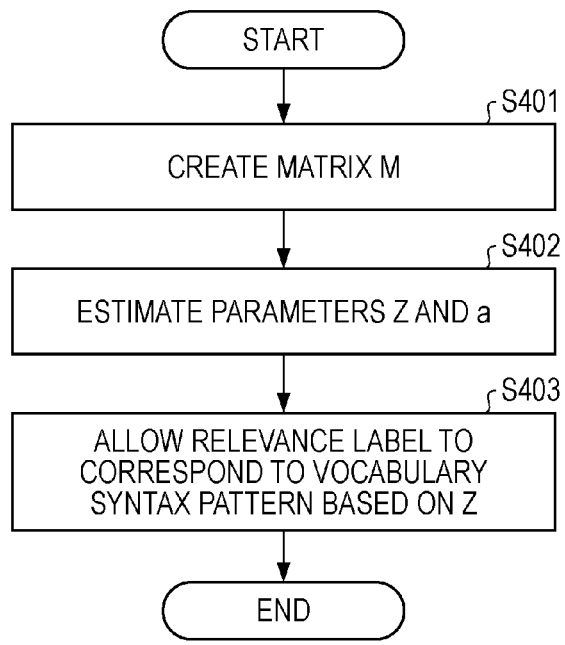
FIG. 16 is a flowchart illustrating a process of granting a label.

This process is a process of step S401 in the flowchart of FIG. 16.

The label granting unit 103 of the information processing apparatus according to the embodiment of the present disclosure acquires the appearing number of times plural vocabulary syntax patterns included in the phrases including the pair of entities appears by analyzing the registration information regarding the existing relevance database having the registration information regarding the pair of entities and the relevance label and the existing document data to be generated for the relevance database. Specifically, the following data are acquired.

The label granting unit 103 acquires:

the number N1 of pairs of entities belonging to a set which has the pairs of entities appearing in phrases having a vocabulary syntax pattern A;

the number N3 of pairs of entities belonging to a set which has the pairs of entities appearing in phrases having a vocabulary syntax pattern B different from the vocabulary syntax pattern A; and the overlapping number N2 of pairs of entities belonging to a set of an overlapping portion between the set of the pairs of entities appearing in the phrases having the vocabulary syntax pattern A and the set of the pairs of entities appearing in the phrases having the vocabulary syntax pattern B.

Further, the label granting unit 103 creates the overlapping ratio matrix M having ratio information regarding the three numbers of entities as elements.

The matrix M is a c by c matrix and is defined by the following expression.

$$M = (m_{c'c}), c = 1, \ldots, C, c' = 1, \ldots, C$$

is a C by C matrix, $$m_{c'c} = \frac{N_{c'c}}{N_c}, m_{cc'} = \frac{N_{cc'}}{N_{c'}}$$

In this expression, $N_{c'}$ is the number of components of the c'-th S(p). Nc is the number of components of the c-th S(p), and $N_{c'c} = N_{cc'}$ is the number of components of a common portion between the c-th S(p) and the c'-th S(p).

Here, $m_{c'c}$ is a ratio is a ratio of the common portion between the c'-th S(p) and the c-th S(p) from the viewpoint of the c-th S(p). This component is used to estimate a probability of wrongly granting BIRTHPLACE to the component of the c-th S(p) when a specific relevance label, in this embodiment, BIRTHPLACE is rightly granted to the c'-th vocabulary syntax pattern and BIRTHPLACE is wrongly granted to the c-th vocabulary syntax pattern.

In step S401 in the flowchart of FIG. 16, the matrix M is created.

Next, in step S402, the parameters Z and a are estimated based on Expression 1 described above. For example, the estimating process is executed by the maximum likelihood estimation method. Further, the estimating process may be executed by, for example, a posterior probability maximization method or the Bayesian method other than the maximum likelihood estimation method as the estimation method.

An example of the estimation algorithm of the maximum likelihood estimation as follows.

That is, the estimation algorithm (i) initializes the parameters Z and a at random;

(ii) alternately repeats updating the following parameters until convergence (there is no variation in the parameter Z and a variation in the parameter a after a steepest ascending method is equal to or less than 0.001);

(ii-i) estimates the parameter a by the steepest ascending method after the parameter Z is fixed; and (ii-ii), sorts the parameters Z for c at random after fixing the parameter a and sequentially resets a value of each parameter Zc while fixing another parameter Zc so that the likelihood is maximum, and repeats the sorting and resetting until there is no variation in the parameter Z.

In step S402, the parameters Z and a are estimated in accordance with the maximum likelihood estimation, the posterior probability maximization method, or the Bayesian method.

Finally, in step S403, the relevance label is set in the selected vocabulary syntax pattern based on the value of the parameter Z as the estimation result obtained in step S402.

That is, the relevance label (in this embodiment, BIRTHPLACE) is granted to the vocabulary syntax pattern determined as "Zc=1."

However, the calculation expression of the error probability bc shown in Expression 2 above have a problem in that a calculation amount is large.

Accordingly, to reduce the calculation cost, the error probability bc can be calculated approximately in accordance with the following calculation expression.

$$b_c = a(1 - \Pi_{c'=1}^{C}(1 - m_{c'c})^{z_{c'}}) + s$$

or $$b_c = a(1 - \Pi_{c'=1}^{C}(1 - m_{c'c})^{z_{c'}} + s)$$

s is a real value of the following range $$0 \leq s \leq \min_c \sum_{c'=1}^{C} (1 - m_{c'c})$$

3-3-2. Example of Process Using Probability Model 2

Next, an example of the label granting process executed using Probability Model 2 will be described.

A probability dense distribution expressed by Expression 3 below is considered.

$$p(D, Z \mid a, M, s) = \qquad \text{Expression 3}$$

$$\prod_{c=1}^{C} \{a^{n_c}(1-a)^{N_c - n_c}\}^{z_c} \{b_c^{n_c}(1-b_c)^{N_c - n_c}\}^{1-z_c}$$

where, $$b_c = a\left\{\sum_{c'=1}^{C} m_{c'c} z_{c'} - \sum_{c'=1}^{C} \sum_{c''=c'+1}^{C} m_{c'c} m_{c''c} z_{c'} z_{c''}\right\} + s$$

$$D = \{N_c, n_c\}, c = 1, \ldots, C, i = 1, \ldots, N_c$$

Likewise, the parameters Z and a with the maximum likelihood are calculated, which becomes a constrained optimization problem of "$0 \leq b_c \leq 1$."

An example of a constrained maximum likelihood estimation algorithm as follows.

The constrained maximum likelihood estimation algorithm (i) initializes the parameters Z and a at random so that the constraint is satisfied;

(ii) alternately repeats updating the following parameters until convergence (there is no variation in the parameter Z and a variation in the parameter a after a steepest ascending method is equal to or less than 0.001), where when each updated parameter does not satisfy the constraint, the algorithm accordingly stops and the immediately previous value is returned as the estimation result;

(ii-i) estimates the parameter a by the steepest ascending method after the parameter Z is fixed; and (ii-ii), sorts the parameters Z for c at random after fixing the parameter a and sequentially resets a value of each parameter Zc while fixing another parameter Zc so that the likelihood is maximum, and repeats the sorting and resetting until there is no variation in the parameter Z.

Further, the parameter s indicating the label error probability caused due to a reason other than agreement of the pair of entities, which is a major reason, may be estimated together with the parameters a and Z.

$$\sum_{c'=1}^{C} m_{c'c} \leq 1 - s$$

In particular, the constrained optimization is caused since "$0 \leq b_c \leq 1$" is satisfied for both parameters Z and a when the expression above is satisfied for all c.

When the condition is satisfied, the calculation amount is small. The parameters Z and a are estimated by the maximum likelihood estimation. The parameters Z and a may be also estimated by the posterior probability maximization method or the Bayesian method.

An example of the estimation algorithm of the maximum likelihood estimation is as follows.

That is, the estimation algorithm (i) initializes the parameters Z and a at random;

(ii) alternately repeats the following execution until convergence (there is no variation in the parameter Z and a variation in the parameter a after a steepest ascending method is equal to or less than 0.001);

(ii-i) estimates the parameter a by the steepest ascending method after the parameter Z is fixed; and (ii-ii), sorts the parameters Z for c at random after fixing the parameter a and sequentially resets a value of each parameter Zc while fixing another parameter Zc so that the likelihood is maximum, and repeats the sorting and resetting until there is no variation in the parameter Z.

The parameter s may be estimated together with the parameters a and Z.

In this way, BIRTHPLACE is granted to the vocabulary syntax pattern of "Zc=1" based on the parameter Z estimated by the process executed applying one of Probability Models 1 and 2 described above.

The result is registered in the relevance database. This process is the process of step S107 in FIG. 11.

4. Process of Adding Pair of Entities

Next, the process of step S107 in FIG. 11 will be described. This process is executed as a process of the label granting unit 103 shown in FIG. 10.

The pair of entities which is not present in the relevance DB in the set S(p) of the pairs of entities of the vocabulary syntax pattern p granted to BIRTHPLACE is added to the relevance DB.

The process of extending the relevance database is executed through the above-described processes.

The following advantages can be obtained through the above-described processes.

It is possible to reduce the wrong relevance label when the relevance label of the relevance DB is granted to the vocabulary syntax pattern (extracted from a document) indicating the relevance between the pair of entities. The reduction in the wrong relevance label is a problem common to labeling to the document data by the relevance DB or a bootstrap method.

It is possible to detect whether the relevance label is wrongly granted to each vocabulary syntax pattern based on different criterions for respective relevance labels.

Wide application can be realized since it is not necessary to set a parameter which may have a large influence on the result.

In the above-described embodiment, the processing example in which the relevance label "BIRTHPLACE" registered in the existing relevance database is granted has been described as a processing example in which the existing relevance database is used. However, for example, in a case where an existing relevance database may not be used or a process of setting a relevance label which is not registered in an existing relevance database is executed, the same processes as those of the above-described embodiment can be executed when the following process is executed as a posterior process.

That is, a plurality of phrases describing a relevance label, such as BIRTHPLACE, desired to be granted are selected. For example, the phrases including "born in" are selected. This process is reliably executed through confirmation of the phrases by a person.

The pairs of the entities extracted from the phrases and the relevance label "BIRTHPLACE" are registered in a tentative database.

A process of supposing the tentative relevance database as an existing database may be executed.

5. Review of Configuration according to Present Disclosure

The specific embodiment of the present disclosure has hitherto been described. However, it is apparent to those skilled in the art that the embodiment of the present disclosure can, of course, be modified or substituted within the scope of the present disclosure without departing from the gist of the present disclosure. That is, the embodiment of the present disclosure has hitherto been described as an example of the present disclosure, and thus has to be construed as being limited. The scope of claims has to be considered to determine the gist of the present disclosure.

The technology disclosed in the specification can be configured as follows.

(1) An information processing apparatus includes: a document analyzing unit that extracts phrases including a pair of entities, to which a relevance label is granted, from document data; and a label granting unit that grants the relevance label indicating relevance between the pair of entities. The label granting unit acquires vocabulary syntax patterns included in the phrases including the pair of entities and acquires the appearing number of times the vocabulary syntax pattern appears in the document data from the document data by analyzing registration information regarding an existing relevance database having registration information regarding the pair of entities and the relevance label and the document data in which at least one phrase including the pair of entities registered in a relevance database is present; for a pair of the vocabulary syntax patterns, counts the number of pairs of entities appearing concurrently with both of each pair of the vocabulary syntax patterns in the document data; and sets a probability model created from a probability density distribution, which includes the counted number of pairs of entities, a parameter Z indicating validity of the granting of the relevance label, and a parameter a indicating a probability of rightly granting the relevance label, calculates the parameters Z and a for which a likelihood is maximum in the probability model, evaluates the validity of the granting of the relevance label for the pair of entities extracted from the document data, and grants the relevance label based on the evaluation result.

(2) In the information processing apparatus described in (1), the label granting unit acquires the vocabulary syntax patterns included in the phrases including the pair of entities by analyzing the registration information regarding the existing relevance database having the registration information regarding the pair of entities and the relevance label and the document data in which at least one phrase including the pair of entities registered in the relevance database is present; acquires the number N1 of pairs of entities belonging to a set which has the pairs of entities appearing in the phrases having a vocabulary syntax pattern A, the number N3 of pairs of entities belonging to a set which has the pairs of entities appearing in the phrases having a vocabulary syntax pattern B different from the vocabulary syntax pattern A, and the overlapping number N2 of pairs of entities belonging to a set of an overlapping portion between the set of the pairs of entities appearing in the phrases having the vocabulary syntax pattern A and the set of the pairs of entities appearing in the phrases having the vocabulary syntax pattern B, and then creates an overlapping ratio matrix M having ratio information regarding the three numbers of entities as elements; and evaluates the validity of the granting of the relevance label for the pair of entities extracted from the document data using a probability model of using the overlapping ratio matrix M and grants the relevance label based on the evaluation result.

(3) In the information processing apparatus described in (2), the overlapping ratio matrix M is a matrix which has a ratio N2/N3 between the numbers N3 and N2 and a ratio N2/N1 between the numbers N1 and N2 as elements.

(4) In the information processing apparatus described in any one of (1) to (3), the label granting unit grants the relevance label to the pair of entities extracted from the document data in accordance with a value of the parameter Z obtained as a result obtained by changing and converging values of the parameters Z and a in order by the use of the probability model.

(5) In the information processing apparatus described in any one of (1) to (4), the parameter Z is a parameter having a value of 1 or 0 depending on whether the relevance label is set rightly or wrongly.

(6) In the information processing apparatus described in any one of (1) to (5), the document analyzing unit acquires data such as the pair of entities included in the extracted phrase, which includes the pair of entities to which the relevance label is granted, and a word string, which is included in a shortest pass binding the pair of entities in a syntax tree of the phrase, as the vocabulary syntax pattern and stores the data in a three-item database.

(7) In the information processing apparatus described in any one of (1) to (6), the label granting unit is configured to select the vocabulary syntax pattern, for which the relevance label is granted, from data stored in the three-item database and excludes the vocabulary syntax pattern in which the number of pairs of entities corresponding to one vocabulary syntax pattern stored in the three-item database is less than a defined value and the vocabulary syntax pattern corresponding to the pair of entities which is not included in the set of the pairs of entities registered in the existing relevance database from the vocabulary syntax pattern to be processed.

(8) In the information processing apparatus described in any one of (1) to (7), the label granting unit executes an estimation algorithm of maximum likelihood estimation as a process of estimating the parameters Z and a, the estimation algorithm which (i) initializes the parameters Z and a at random and (ii) alternately repeats updating following parameters until convergence (there is no variation in the parameter Z and a variation in the parameter a after a steepest ascending method is equal to or less than 0.001) and which (ii-i) estimates the parameter a by the steepest ascending method after the parameter Z is fixed and (ii-ii), sorts the parameters Z for c at random after fixing the parameter a and sequentially resets a value of each parameter Zc while fixing another parameter Zc so that the likelihood is maximum, and repeats the sorting and resetting until there is no variation in the parameter Z.

A processing method executed in the above-described information processing apparatus or a program executing the process method are included in the configuration of the present disclosure.

In the specification, the above-described series of processes may be executed by hardware, software, or a combination configuration thereof. When the processes are executed by software, the program recording a processing sequence may be installed in a memory of a dedicated hardware-embedded computer or may be installed in a general computer capable of executing various kinds of processing so as to be executed. For example, the program may be stored in advance in a recording medium. As well as the installation from the recording medium to the computer, the program may be received via a network such as a LAN (Local Area Network) or the Internet and may be installed in a recording medium such as an internal hard disc.

The various processes described in the specification may be executed chronologically as in the description or may be executed in parallel or individually depending on the processing capability of the apparatus executing the processes or as necessary. A system in the specification has a logical collective configuration of a plurality of apparatuses and is not limited to a configuration in which apparatuses with a configuration are included in the same casing.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a processor serving as:
a document analyzing unit that extracts phrases including a pair of entities, to which a relevance label is granted, from document data, and
a label granting unit that grants the relevance label indicating a kind of relevance between the pair of entities,
wherein the label granting unit:
acquires vocabulary syntax patterns included in the phrases including the pair of entities and acquires the appearing number of times the vocabulary syntax pattern appears in the document data from the document data by analyzing registration information regarding an existing relevance database having registration information regarding the pair of entities and the relevance label and the document data in which at least one phrase including the pair of entities registered in a relevance database is present,
for a pair of the vocabulary syntax patterns, counts the number of pairs of entities appearing concurrently with both of each pair of the vocabulary syntax patterns in the document data, and
sets a probability model created from a probability density distribution, which includes the counted number of pairs of entities, a parameter "Z" indicating validity of the granting of the relevance label, and a parameter "a" indicating a probability of rightly granting the relevance label, calculates the parameters Z and a for which a likelihood is maximum in the probability model, evaluates the validity of the granting of the relevance label for the pair of entities extracted from the document data, and grants the relevance label based on the evaluation result.

2. An information processing apparatus, comprising:
a processor serving as:
a document analyzing unit that extracts phrases including a pair of entities, to which a relevance label is granted, from document data, and
a label granting unit that grants the relevance label indicating relevance between the pair of entities,
wherein the label granting unit:
acquires vocabulary syntax patterns included in the phrases including the pair of entities and acquires the appearing number of times the vocabulary syntax pattern appears in the document data from the document data by analyzing registration information regarding an existing relevance database having registration information regarding the pair of entities and the relevance label and the document data in which at least one phrase including the pair of entities registered in a relevance database is present, for a pair of the vocabulary syntax patterns, counts the number of pairs of entities appearing concurrently with both of each pair of the vocabulary syntax patterns in the document data, and
sets a probability model created from a probability density distribution, which includes the counted number of pairs of entities, a parameter "Z" indicating validity of the granting of the relevance label, and a parameter "a" indicating a probability of rightly granting the relevance label, calculates the parameters Z and a for which a likelihood is maximum in the probability model, evaluates the validity of the granting of the relevance label for the pair of entities extracted from the document data, and grants the relevance label based on the evaluation result, and the label granting unit:
acquires the vocabulary syntax patterns included in the phrases including the pair of entities by analyzing the registration information regarding the existing relevance database having the registration information regarding the pair of entities and the relevance label and the document data in which at least one phrase including the pair of entities registered in the relevance database is present,
acquires the number N1 of pairs of entities belonging to a set which has the pairs of entities appearing in the phrases having a vocabulary syntax pattern A, the number N3 of pairs of entities belonging to a set which has the pairs of entities appearing in the phrases having a vocabulary syntax pattern B different from the vocabulary syntax pattern A, and the overlapping number N2 of pairs of entities belonging to a set of an overlapping portion between the set of the pairs of entities appearing in the phrases having the vocabulary syntax pattern A and the set of the pairs of entities appearing in the phrases having the vocabulary syntax pattern B, and then creates an overlapping ratio matrix M having ratio information regarding the three numbers of entities as elements, and
evaluates the validity of the granting of the relevance label for the pair of entities extracted from the document data using a probability model of using the overlapping ratio matrix M and grants the relevance label based on the evaluation result.

3. The information processing apparatus according to claim 2, wherein the overlapping ratio matrix M is a matrix which has a ratio N2/N3 between the numbers N3 and N2 and a ratio N2/N1 between the numbers N1 and N2 as elements.

4. The information processing apparatus according to claim 1, wherein the label granting unit grants the relevance label to the pair of entities extracted from the document data in accordance with a value of the parameter Z obtained as a result obtained by changing and converging values of the parameters Z and a in order by the use of the probability model.

5. The information processing apparatus according to claim 1, wherein the parameter Z is a parameter having a value of 1 or 0 depending on whether the relevance label is set rightly or wrongly.

6. The information processing apparatus according to claim 1, wherein the document analyzing unit acquires data such as the pair of entities included in the extracted phrase, which includes the pair of entities to which the relevance label is granted, and a word string, which is included in a shortest pass binding the pair of entities in a syntax tree of the phrase, as the vocabulary syntax pattern and stores the data in a three-item database.

7. The information processing apparatus according to claim 1, wherein the label granting unit is configured to select the vocabulary syntax pattern, for which the relevance label is granted, from data stored in the three-item database and excludes the vocabulary syntax pattern in which the number of pairs of entities corresponding to one vocabulary syntax pattern stored in the three-item database is less than a defined value and the vocabulary syntax pattern corresponding to the pair of entities which is not included in the set of the pairs of entities registered in the existing relevance database from the vocabulary syntax pattern to be processed.

8. An information processing apparatus, comprising:
a processor serving as:
a document analyzing unit that extracts phrases including a pair of entities, to which a relevance label is granted, from document data, and
a label granting unit that grants the relevance label indicating relevance between the pair of entities,
wherein the label granting unit:
acquires vocabulary syntax patterns included in the phrases including the pair of entities and acquires the appearing number of times the vocabulary syntax pattern appears in the document data from the document data by analyzing registration information regarding an existing relevance database having registration information regarding the pair of entities and the relevance label and the document data in which at least one phrase including the pair of entities registered in a relevance database is present,
for a pair of the vocabulary syntax patterns, counts the number of pairs of entities appearing concurrently with both of each pair of the vocabulary syntax patterns in the document data, and
sets a probability model created from a probability density distribution, which includes the counted number of pairs of entities, a parameter "Z" indicating validity of the granting of the relevance label, and a parameter "a" indicating a probability of rightly granting the relevance label, calculates the parameters Z and a for which a likelihood is maximum in the probability model, evaluates the validity of the granting of the relevance label for the pair of entities extracted from the document data, and grants the relevance label based on the evaluation result, and executes an estimation algorithm of maximum likelihood estimation as a process of estimating the parameters Z and a, the estimation algorithm which (i) initializes the parameters Z and a at random and (ii) alternately repeats updating following parameters until convergence whereby there is no variation in the parameter Z and a variation in the parameter a after a steepest ascending method is equal to or less than 0.001, and which (ii-i) estimates the parameter a by the steepest ascending method after the parameter Z is fixed and (ii-ii), sorts the parameters Z for c at random after fixing the parameter a and sequentially resets a value of each parameter Zc while fixing another parameter Zc so that the likelihood is maximum, and repeats the sorting and resetting until there is no variation in the parameter Z.

9. An information processing method which is executed in an information processing apparatus, the method comprising:
extracting phrases including a pair of entities, to which a relevance label is granted, from document data; and
granting the relevance label indicating a kind of relevance between the pair of entities,
wherein the granting of the relevance label includes
acquiring vocabulary syntax patterns included in the phrases including the pair of entities and acquiring the appearing number of times the vocabulary syntax pattern appears in the document data from the document data by analyzing registration information regarding an existing relevance database having registration information regarding the pair of entities and the relevance label and the document data in which at least one phrase including the pair of entities registered in a relevance database is present,
for a pair of the vocabulary syntax patterns, counting the number of pairs of entities appearing concurrently with both of each pair of the vocabulary syntax patterns in the document data, and
setting a probability model created from a probability density distribution, which includes the counted number of pairs of entities, a parameter "Z" indicating validity of the granting of the relevance label, and a parameter "a" indicating a probability of rightly granting the relevance label, calculating the parameters Z and a for which a likelihood is maximum in the probability model, evaluating the validity of the granting of the relevance label for the pair of entities extracted from the document data, and granting the relevance label based on the evaluation result.

10. A memory having recorded therein a computer program for causing an information processing apparatus to execute information processing comprising:
extracting phrases including a pair of entities, to which a relevance label is granted, from document data; and
granting the relevance label indicating a kind of relevance between the pair of entities,
wherein the granting of the relevance label includes
acquiring vocabulary syntax patterns included in the phrases including the pair of entities and acquiring the appearing number of times the vocabulary syntax pattern appears in the document data from the document data by analyzing registration information regarding an existing relevance database having registration information regarding the pair of entities and the relevance label and the document data in which at least one phrase including the pair of entities registered in a relevance database is present, for a pair of the vocabulary syntax patterns, counting the number of pairs of entities appearing concurrently with both of each pair of the vocabulary syntax patterns in the document data, and setting a probability model created from a probability density distribution, which includes the counted number of pairs of entities, a parameter "Z" indicating validity of the granting of the relevance label, and a parameter "a" indicating a probability of rightly granting the relevance label, calculating the parameters Z and a for which a likelihood is maximum in the probability model, evaluating the validity of the granting of the relevance label for the pair of entities extracted from the document data, and granting the relevance label based on the evaluation result.

* * * * *